US006950431B1

(12) United States Patent
Nozaki et al.

(10) Patent No.: US 6,950,431 B1
(45) Date of Patent: Sep. 27, 2005

(54) NETWORK RELAY APPARATUS

(75) Inventors: Shinji Nozaki, Yokohama (JP); Sunao Sawada, Yokohama (JP); Tatsuya Watanuki, Ebina (JP); Ken Watanabe, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 789 days.

(21) Appl. No.: 09/656,138

(22) Filed: Sep. 6, 2000

(30) Foreign Application Priority Data

Oct. 4, 1999 (JP) ................................. 11-282426

(51) Int. Cl.[7] ............................................ H04L 12/28
(52) U.S. Cl. ....................... 370/390; 370/432; 709/249
(58) Field of Search ................................ 370/389, 390,
370/392, 432, 400, 401; 709/238, 249

(56) References Cited

U.S. PATENT DOCUMENTS

| 5,684,800 | A | * | 11/1997 | Dobbins et al. ............. 370/401 |
| 5,831,975 | A | * | 11/1998 | Chen et al. .................. 370/256 |
| 5,946,308 | A | * | 8/1999 | Dobbins et al. ............. 370/392 |
| 6,094,435 | A | * | 7/2000 | Hoffman et al. ............ 370/414 |
| 6,115,378 | A | * | 9/2000 | Hendel et al. .............. 370/392 |
| 6,147,995 | A | * | 11/2000 | Dobbins et al. ............ 370/392 |
| 6,581,166 | B1 | * | 6/2003 | Hirst et al. .................... 714/4 |

* cited by examiner

Primary Examiner—Bob A. Phunkulh
(74) Attorney, Agent, or Firm—Mattingly, Stanger, Malur & Brundidge, P.C.

(57) ABSTRACT

In an information network having a complex structure made of a logical network and also a physical network, such an information network is constituted so as to realize a multicast service capable of not increasing an amount of a network traffic larger than a necessary traffic amount. This information network contains a plurality of information relay apparatuses for relaying information among a plurality of VLANs (Virtual Local Area Networks), a network for connecting these information replay apparatuses to each other, a multicast server and a plurality of terminals, belonging to an arbitrary VLAN of these VLANs. A multicast relay processing unit, a multicast address learning processing unit, and a multicast learning table are provided in each of these information relay apparatuses so as to register a predetermined relay destination of a multicast communication. Even in such a case that the VLAN structure is made complex irrespective of the physical network structure, it is possible to distribute such a multicast packet suitable for the physical network structure.

33 Claims, 16 Drawing Sheets

FIG. 2

| VLAN-ID (21) | PORT LIST (22) | LEARNING VALID PORT LIST (23) |
|---|---|---|
| ---------- | ---------- | ---------- |

| RECEPTION INFORMATION | DESTINATION MULTICAST ADDRESS | ~31 |
|---|---|---|
| | TRANSMISSION SOURCE ADDRESS | ~32 |
| | RECEPTION VLAN-ID | ~33 |
| TRANSMISSION INFORMATION | TRANSMISSION VLAN-ID | TRANSMISSION PORT LIST |
| | TRANSMISSION VLAN-ID | TRANSMISSION PORT LIST |
| | TRANSMISSION VLAN-ID | TRANSMISSION PORT LIST ~35 |
| | ---------- | ---------- |

| RECEPTION INFORMATION | DESTINATION IP MULTICAST ADDRESS | ~61 |
| --- | --- | --- |
| | TRANSMISSION SOURCE IP ADDRESS | ~62 |
| | RECEPTION VLAN-ID | ~63 |
| TRANSMISSION INFORMATION | TRANSMISSION VLAN-ID | TRANSMISSION PORT LIST |
| | TRANSMISSION VLAN-ID | TRANSMISSION PORT LIST |
| | TRANSMISSION VLAN-ID | TRANSMISSION PORT LIST ~65 |
| | ---------- | ---------- |

| RECEPTION INFORMATION | DESTINATION IP MULTICAST ADDRESS | | | ~701 |
| --- | --- | --- | --- | --- |
| | TRANSMISSION SOURCE IP ADDRESS | | | ~702 |
| | REPRESENTATIVE RECEPTION VLAN-ID | | | ~703 |
| | REPRESENTATIVE RECEPTION PORT | | | ~704 |
| | LEARNING PACKET TTL | | | ~705 |
| | VALID/INVALID FLAG | | | ~706 |
| TRANSMISSION INFORMATION | TRANSMISSION PORT | TRANSMISSION VLAN-ID | TTL SUBTRACTION NUMBER | TRANSMISSION SOURCE SECOND LAYER ADDRESS |
| | ------ | ------ | ------ | ------ |

707  708  709  710

NETWORK RELAY APPARATUS

BACKGROUND OF THE INVENTION

The present invention is generally related to an information relay technique, and more specifically, is directed to such a technique capable of being effectively applied to an information network-to-network connecting appliance such as a LAN switch.

In general, various data distribution methods have been used in information communication fields, namely in a so-called "multicast distribution method", the same data is distributed at the same time-from one host to a plurality of hosts. In this multicast distribution method, a plurality of hosts constitute a specific group. While one multicast packet is employed, the same data is distributed to all of hosts belonging to a specific group. Even in the TCP/IP (Transmission Control Protocol/Internet Protocol) corresponding to the standard protocol used in the Internet, there is provided a co-called "IP multicast" technique using this multicast distribution.

An IP multicast system implies such a system capable of performing a multicast communication by an IP address. In an IP multicast system, a specific IP address called as an IP multicast address is defined every specific group. Since an IP multicast packet is used in which an IP multicast address is employed as a destination IP address, the same data is distributed to all of hosts contained in a specific group. In this case, an "IP multicast" implies that a multicast packet transmitted by a multicast server is relayed to a reception terminal of such a host which announces a member of a multicast by a relay process operation executed in specific groups, without considering structures formed in the specific groups. In accordance with this IP multicast technique, while the same data is distributed to the reception terminals of the plural hosts, the following merit can be achieved. That is, while the data is not transmitted to the respective reception terminals, only one packet is transmitted, so that the data can be distributed to all of the reception terminals provided in the specific groups.

An IP multicast corresponds to a protocol of a third layer (network layer) of an OSI (Open Systems Interconnection) reference model, namely such a protocol capable of realizing a multicast communication between second layer (data link layer) networks.

On the other hand, there is such a VLAN (Virtual Local Area Network) technique capable of virtually constituting a second layer (data link) network which may constitute a reference of an IP multicast data distribution.

In this VLAN technique, when a network structure is added, deleted, and changed, a second layer (data link layer) network can be logically constructed without receiving a limitation of a physical network structure. For example, in a physical structure, while a second layer (data link layer) network is logically constituted by communication apparatuses of hosts which are separately connected to different information relay apparatuses, data can be communicated by way of the second layer (data link layer). This VLAN technique owns the following advantage. That is, while the structure of the second layer (data link layer) is changed, there is no need to change the structure of the physical network.

The VLAN technique corresponds to such a technique capable of constituting a network second is layer (data link layer), and therefore, this VAN technique does not depend upon a third layer (network layer) protocol such as an IP multicast. On the other hand, a third layer protocol such as an IP multicast does not either depend upon a method for constituting a second layer (data link layer) network.

To realize such a VLAN, several methods may be employed. For instance, an IP communication may be carried out among VLANs in a layer-3 VLAN system realized by such a system for allocating an IP subnet in a TCP/IP protocol to VLANS.

SUMMARY OF THE INVENTION

There is such a case that a specific group is constructed of an IP subnet in an IP multicast. In this case, when the IP subnet is allocated to the VLAN, the specific group in the IP multicast can be arranged by the VLAN.

A multicast packet transmitted from a multicast server is processed by a multicast relay process operation among VLANs in such a manner that this multicast packet is transmitted from a VAN equal to an IP subnet to which the multicast server belongs, to a plurality of VLANs equal to IP subnets to which reception terminals belong.

However, the IP multicast applied to the relay process operation executed among these VLANs is the protocol of the third layer (network layer), and is not made in conjunction with the VLAN used to constitute the network of the second layer (data link layer). As a consequence, in order to relay the same multicast packet between the different VLANs and within the different VLANS, there is such a case that the same multicast packet is reciprocated plural times in the physically same relay apparatus. Also, there is another case that the duplicated multicast packets having the same contents may pass through the physically same relay apparatus plural times. As a result, unnecessary amounts of traffics are produced. This problem is caused by allocating the IP subnet to the VLAN so as to realize the IP multicast.

When a total number of logically set VLANs is increased, a total number of logical destinations of IP multicasts which are processed by relay process operations among LANs. As a consequence, since a large number of multicast packets are relayed to the physically same relay apparatuses, a total amount of multicast packets which are processed by the relay process operation is increased, so that the loads required in the IP multicast relay process operations are increased.

Therefore, reductions/controls of traffics of networks in multicast services may constitute very important technical aspects in order to popularize information distributions under LAN environments where, for example, communication apparatuses equipped with VLAN functions such as a LAN switch are popularized, and further to popularize multicast services such as television conferences.

The present invention has been made to solve such problems, and therefore, has an object to provide an information relay technique capable of providing a multicast service without increasing an amount of traffics of a network larger than a necessary traffic amount.

Also, another object of the present invention is to provide such an information relay technique capable of realizing a high-quality multicast relay processing operation at a high speed, while reducing a load given to a multicast relay processing operation of an information relay apparatus.

Furthermore, another object of the present invention is to provide an information relay technique capable of realizing/ utilizing a high-speed/high-quality multicast service of a multicast relay processing operation by an information relay apparatus, while suppressing an increase in a network traffic required in such a multicast service.

The present invention is featured by that a multicast relay destination registering table, for instance, a multicast learning table is employed in an information relay apparatus for relaying information in a plurality of logically-constituted information networks. In this information relay apparatus, after a VLAN has been constituted, and thereafter, a multicast packet has been firstly received, predetermined information related to a replay processing operation of a multicast packet is registered into the multicast relay destination registering table as a learning process operation. As a consequence the information relay apparatus may obtain as a learning result, such a multicast relay destination registering table in the case that one multicast packet is relayed to one destination.

In other words, within a time duration which is defined after the VLAN has been constituted and thereafter the multicast packet has been first received, and until the learning process operation is completed, predetermined information related to the relaying operation of one multicast packet to one destination is registered into the multicast relay destination registering table. Furthermore, the information relay apparatus, according to the present invention, executes the registering process operation of the multicast relay information into the multicast relay destination registering table, and further, relays the multicast packet from such a relay apparatus to the same destinations. This relay apparatus is involved in the relay apparatuses which are physically identical to each other, but are logically different from each other. In this case, while the information relay apparatus refers to the multicast relay destination registering table, when these multicast packets are equal to the same multicast packets, this information relay apparatus transmits the multicast packets identical to these multicast packets only one time. As a result, this information relay apparatus can suppress the total relaying time of the same multicast packets only to one relaying time, although the conventional information relay apparatus relays the same multicast packets plural times.

Also, in the case that the information relay apparatus of the present invention relays the multicast packet after the learning process operation has been accomplished, this information relay apparatus transmits the received multicast packet to all of the transmission destinations which are registered in the multicast relay destination registering table. As a result, the multicast packet may be relayed only one time by the relay apparatuses which are physically identical to each other, and are involved in the logically different networks.

For instance, in an IPv4 multicast, a predetermined relay destination of a multicast packet with respect to a destination is registered into the multicast relay destination registering table in connection with such an information as a TTL (Time to Live) value used to rewrite a multicast packet. As a consequence, within a time duration which is defined after a multicast packet has been first received, and until a learning process operation is accomplished, in the case that the information relay apparatus of the present invention relays a multicast packet from networks which are logically different from each other, but are physically same relay apparatuses, to the same destinations, if these data are the same data, then only such data is transmitted, in which the TTL value of the IP header is the maximum value.

Also, after the learning process operation has been accomplished, in such a case that the information relay apparatus of the present invention relays such a multicast packet whose TTL value is the maximum value and which is directed to one destination, the information relay rewrites such a packet as a TTL based upon the rewrite information registered in the multicast relay destination registering table, and thereafter, relays the rewritten multicast packet to all of preselected relay destinations.

BRIEF DESCRIPTION OF THE DRAWINGS

For a better understanding of the present invention, reference is made of a detailed description to be read in conjunction with the accompanying drawings, in which;

FIG. 2 is a conceptional diagram for showing an example of a content of a VLAN table;

FIG. 3 is a conceptional diagram for indicating an example of a content of a multicast table;

FIG. 6 is a conceptional diagram for showing an example of a content of an IP multicast table;

FIG. 7 is a conceptional diagram for indicating an example of a content of an IP multicast learning table;

DESCRIPTION OF THE EMBODIMENTS

Next, a description will now be made of information relay apparatuses according to various embodiment of the present invention.

Figure 1:
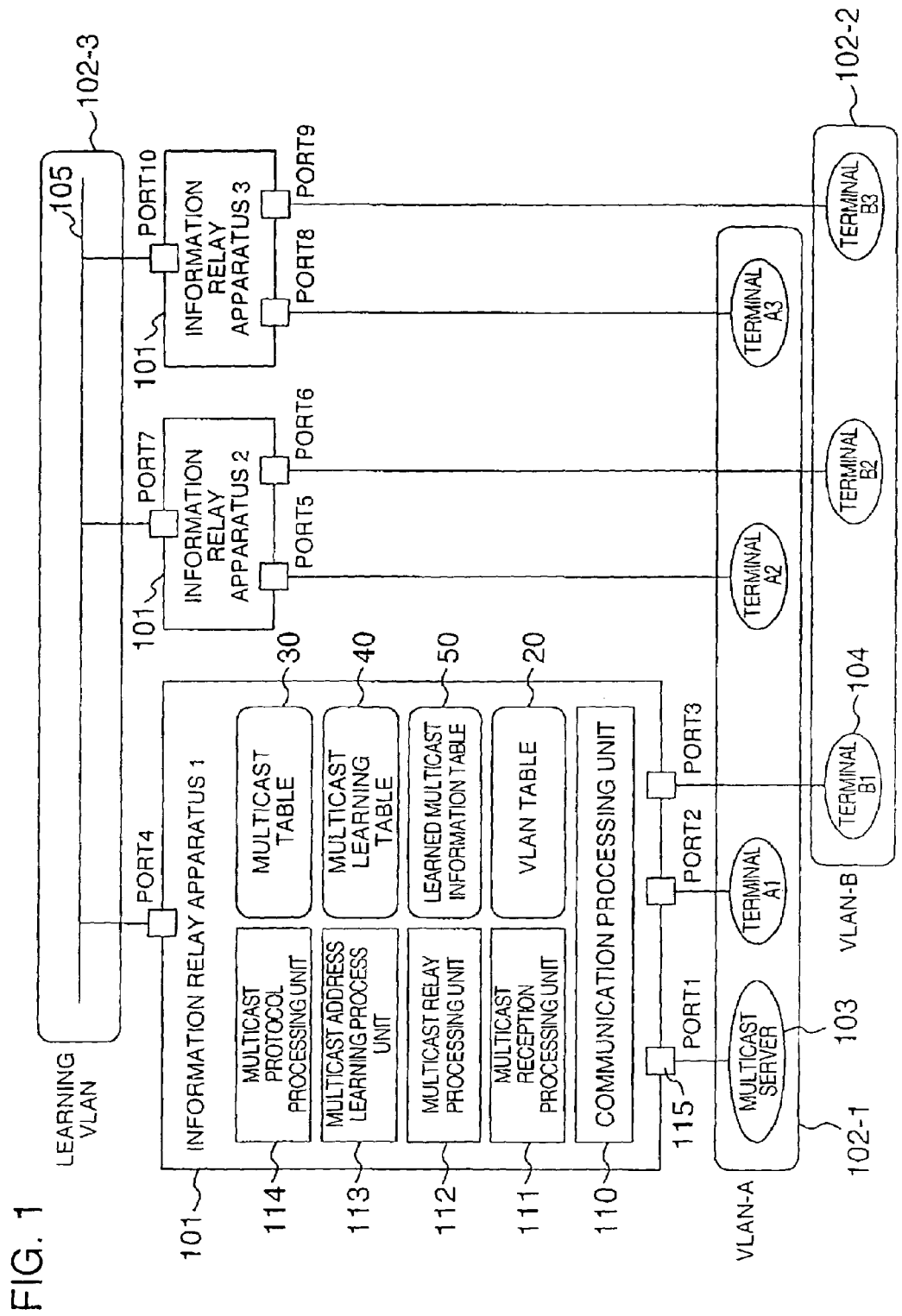
FIG. 1 is a conceptional structural diagram for indicating an information network containing an example of an information relay apparatus according to the present invention.

FIG. 1 is a conceptional diagram for schematically showing an arrangement of an information network containing an information relay apparatus according to an embodiment of the present invention. An information relay apparatus corresponds to a network-to-network connecting appliance such as a LAN switch, which connects logically constructed networks.

The information network shown in FIG. 1 is arranged by a plurality of VLANs 102 (namely, VLAN-A 102-1, VLAN-B 102-2, and learning LAN 102-3); a plurality of information relay apparatuses 101; a network 105; a multicast server 103; a terminal 104 such as a host; and also another terminal 104 such as a host The plural information relay apparatuses 101 (namely, information relay apparatus 1, information relay apparatus 2, information relay apparatus 3) perform information relay operation among a plurality of VLANs 102. The network 105 connects a plurality of information relay apparatuses 101 to each other. The multicast server 103 is connected to the VLAN-A (102-1). The terminal 104 (terminal A1, terminal A2, terminal A3) is connected to the VLAN-A (102-1). The terminal 104 (terminal B1, terminal B2, terminal B3) is connected to the VLAN-B (102-2).

In this embodiment, each of the above-described information relay apparatuses 101 contains a communication processing unit 110, a multicast reception processing unit 111, a multicast relay processing unit 112, a multicast address learning process unit 113, a multicast protocol processing unit 114, a plurality of ports 115, a VLAN table 20, a learned multicast information table 50, a multicast learning table 40, and a multicast table 30.

The communication processing unit 110 controls transmission/reception of information executed between this communication processing unit 110 and, for instance, an external terminal via a plurality of ports 115 (namely ports 1 to 10) provided in the information relay apparatus 101.

As indicated in a flow chart of FIG. 9 (will be discussed later), the multicast reception processing unit 110 allocates a process operation of a multicast packet to either a multicast relay process operation or a multicast protocol process operation in response to a sort of a multicast packet. It should be noted that the multicast reception processing unit 111 may be constructed of software.

As shown in a flow chart of FIG. 10 (will be explained later), the multicast relay processing unit 112 sends out a received multicast packet to a predetermined transmission destination, and furthermore, allocates this received multicast packet to a multicast address learning process operation. It should also be noted that the multicast relay producing unit 112 may be arranged by software.

The multicast address learning process unit 113 executes an operation for forming a multicast learning table based upon a transmission destination in the multicast relay processing unit 112. It should also be noted that the multicast address learning unit 113 may be constructed of software.

The multicast protocol processing unit 114 processes a message used to a control protocol of a multicast packet, for instance, an IP multicast and a multicast in a VLAN. It should also be noted that the multicast protocol processing unit 114 may be arranged by software.

A detailed content of the VLAN table 20 of FIG. 1 is represented as a VLAN (virtual Local Area Network) 20 shown in FIG. 2. In the VLAN table 20, a VLAN-ID 21, a port list 22, and a learning valid port list 23 are registered in correspondence with each other. One information relay apparatus 101 is connected via each of the ports 115 to either another information relay apparatus 101 or the terminal 104. The VLAN-ID 21 corresponds to an ID identifier of the learning VLAN 102-3 existed between the respective information relay apparatuses 101, or an ID identifier of the VLAN 102 to which this terminal 104 belongs. The port list 22 is provided in correspondence with the respective VLAN-IDS 21, and corresponds to a list of the ports 115 connected to the terminal 104 provided in another information relay apparatus 101 or the VLAN 102. The learning valid port list 23 indicates as to whether the port 115 registered in the port list 22 corresponds to a valid port for a learning process operation, or an invalid port for the learning process operation.

The term "learning" used in the present invention implies that when each of the information relay apparatuses 101 receives a multicast packet, the own information relay apparatus records all of relay destinations to which this multicast packet should be transmitted in the multicast learning table 40. In a newly constituted VLAN, in the case that a preselected time duration has passed after a multicast packet was firstly received and then a learning process operation has been accomplished, the same multicast packet which is directed to the same destination is not repeated plural times by such an information relay apparatus 101 which is physically identical to the same information relay apparatus 101, and is contained in a logically different network.

Also, when both the own information relay apparatus 101 and another information relay apparatus 101 connected to the own information relay apparatus 101 have the learning functions, the learning operation is valid. To the contrary, when at least one of the own information relay apparatus 101 and another information relay apparatus 101 connected to the own information relay apparatus 101 does not have the learning function, the learning operation is invalid. The fact as to whether a learning operation is valid, or invalid is automatically set by such a manner that after a network is established, the respective information relay apparatuses communicate to each other. This communication may be preferably carried out by adding specific information to either a dedicated packet or a packet header. Alternatively, the information indicative of either the valid learning operation or the invalid learning operation may be manually set.

The learning VLAN 102-3 is set in such a case that both the own information relay apparatus 101 and another information relay apparatus 101 connected to the own information relay apparatus 101 have the learning functions. The learning VLAN 102-3 corresponds to a network which is constituted by, for instance, the own information relay apparatus 101, another information relay apparatus 101 connected to the own information relay apparatus 101, and also a transfer medium 105 connected between the own information relay apparatus 101 and another information relay apparatus 101.

It is preferable to previously allocate a VLAN-ID of the learning VLAN 102-3. However, not only the VLAN-ID of the learning VLAN 102-3 is previously allocated, but also such a case that a VLAN-ID is not yet designated may be regarded as the VLAN-ID of this learning VLAN 102-3. The information relay apparatus 101 which has received a multicast packet may recognize that this received multicast packet is received from the learning VLAN 102-3 based upon the VLAN-ID of the learning VLAN 102-3. Also, when a multicast packet is transmitted to the learning VLAN 102-3, the multicast packet is transmitted to the VLAN-ID of the learning VLAN 102-3.

A detailed content of the multicast table 30 of FIG. 1 is indicated in a multicast table 30 of FIG. 3. The multicast table 30 is constituted by the respective entries in which information classified to both reception information and transmission information is recognized as one element, respectively, and these reception information and transmission information are made in correspondence with each other.

As this reception information, a destination multicast address 31, a transmission source address 32, and a reception VLAN-ID 33 are registered. The destination multicast address 31 corresponds to a destination of a multicast packet. The transmission source address 32 corresponds to a transmission source address of a multicast packet. The reception VLAN-ID 33 corresponds to such a VLAN-ID of a VLAN when the information relay apparatus 101 receives a multicast packet, and also corresponds to a VLAN-ID of a VLAN in a transmission source direction of the multicast packet received by the information relay apparatus 101. The reason why both the transmission source address 32 and the reception VLAN-ID 33 are provided is to achieve such a purpose. That is to say, the information relay apparatus 101 can be easily conducted into a network environment constituted by a router. In a router, an algorithm is popularized, and this algorithm requires both a transmission source address and a reception VLAN-ID when route information is produced. It should also be noted that a router is operated at a level higher than, or equal to the third layer (namely, network layer), and is used to mutually connect different networks to each other.

As the transmission information corresponding to the reception information, a transmission VLAN-ID 34 and a transmission port list 35 are registered in correspondence with each other. The transmission VLAN-ID 34 corresponds to a VLAN-ID of a transmission destination VLAN of a multicast packet corresponding to the reception information, a total number of which is equal to that of transmission destination VLANs. The transmission port list 35 is provided in correspondence with the transmission VLAN-ID 34, and corresponds to such a list of the ports 115 used to connect to the information relay apparatus 101 provided between the own port and the VLAN 102 equal to the transmission destination, or the terminal 104 employed in the VLAN 102.

There are two cases, depending upon a protocol corresponding to the multicast protocol processing unit 114. That is, these two cases are given by that the transmission source address 32 is required, and also is not required. Also, the multicast table 30 shown in FIG. 3 may be used in both an information relay process operation between VLANs, and also an information relay process operation within a VLAN.

Figure 4:
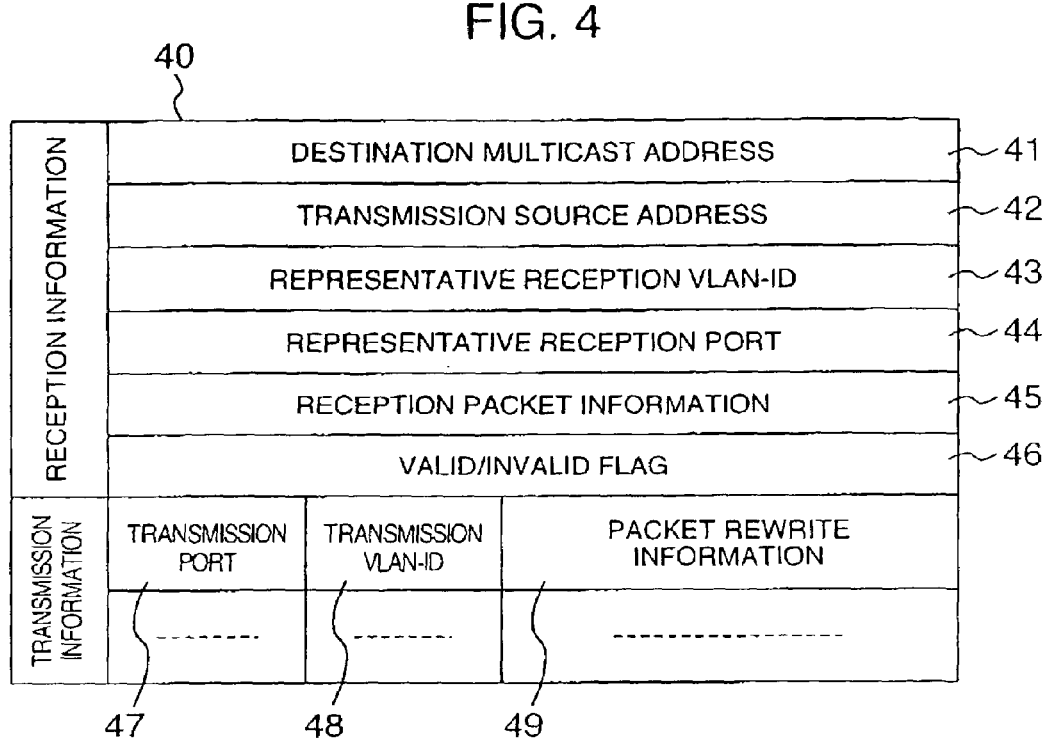
FIG. 4 is a conceptional diagram for showing an example of a content of a multicast learning table.

A detailed content of the above-explained multicast learning table 40 is represented in a multicast learning table 40 indicated in FIG. 4. This multicast learning table 40 corresponds to a table for recording thereon a learning result of multicast packets which have been relayed for a time period defined from a time instant when a multicast packet is first received up to a time instant when a learning process operation is completed. The multicast learning table 40 is constituted by entries in which information classified into both reception information and transmission information is made as one element, respectively, in correspondence with each other.

As the reception information, there are registered: a destination multicast address 41, a transmission source address 42, a representative reception VLAN-ID 43, a representative reception port 44, reception packet information 45, and a valid/invalid flag 46. The destination multicast address 41 corresponds to a destination address of a multicast packet. The transmission source address 42 corresponds to a transmission source address of a multicast packet. The representative reception VLAN-ID 43 shows a VLAN-ID of a VLAN of a multicast packet reception source. The representative reception port 44 corresponds to a learning result indicative of a port which receives a multicast packet. The reception packet information 45 represents information owned by a multicast packet, before being rewritten. The valid/invalid flag 46 indicates as to whether information registered into the multicast learning table 40 is valid, or invalid. The valid/invalid table 46 is automatically switched from a valid state to an invalid state in response to such a chance that after the information relay apparatus 101 has been connected to a logically constituted network, a predetermined time duration has elapsed. This predetermined time duration is preferably equal to such a time duration defined from a time instant when a multicast packet is first received up to a time instant when a learning process operation is completed. In the case that such a packet is received from the same representative reception port 44, the destination multicast address 41 and the transmission source address 42 of which are identical to those of the multicast packet which has already been transmitted, if the column of the learning valid port list 23 is valid, then this column is changed into the invalid state, whereas if the column of the learning valid port list 23 is invalid, then the invalid state is maintained.

The transmission information is provided in correspondence with the reception information, and is employed when a multicast packet is transmitted. As to the transmission information, a transmission port 47, a transmission VLAN-ID 48, and packet rewrite information 49 are registered in correspondence with each other.

The transmission port 47 corresponds to such a port through which a multicast packet is transmitted. A total entry number of the transmission port 47 is equal to [(total port number)−1]. The expression [(total port number)−1] implies such a quantity obtained by subtracting 1 equal to a reception port number of a multicast packet from a total port number owned by the own information relay apparatus 101. The transmission VLAN-ID 48 corresponds to a VLAN-ID of a transmission destination VLAN of a multicast packet corresponding to reception information. The packet rewrite information 49 corresponds to information employed so as to rewrite a multicast packet.

Similar to the multicast table 30, the transmission source address 42 is required and is not required, depending upon a protocol corresponding to the multicast protocol processing unit 114. Also, similar to the multicast table 30 shown in FIG. 3, the multicast learning table 40 shown in FIG. 4 is used in both an information relay processing operation among VLANs and also an information relay processing operation within a VLAN.

In the case that the learning process operation is completed, a multicast packet is relayed by employing the multicast learning table 40, so that the effect of the present invention can be achieved. In other words, when the multicast packet is relayed, in such a case that all of the destination multicast address 41, the transmission source address 42, the representative reception VLAN-ID 43, the representative reception port 44, and the reception packet information 45, which are contained in the reception information of the multicast learning table 40, are made equal to all of a destination address, a transmission source address, a VLAN-ID of a reception VLAN, and a reception port of a received multicast packet, respectively, the information replay apparatus 101 transmits this received multicast packet to all of the transmission destinations contained in the transmission information of this multicast learning table 40. All of these transmission destinations correspond to all of transmission ports which are registered into a column of a transmission port 47. As a result, an occurrence of unnecessary traffics can be avoided, while avoiding such cases that the same multicast packet is sent/returned to/from the physically same relay apparatus plural times, and/or the duplicated same multicast packet passes through the physically same relay apparatus plural times.

Every time the information replay apparatus 101 receives the multicast packet, the information relay apparatus 101 registers the information related to the multicast packet into the learned multicast information table 50 for a time duration defined after the multicast packet is first received until the learning process operation is completed.

Figure 5:
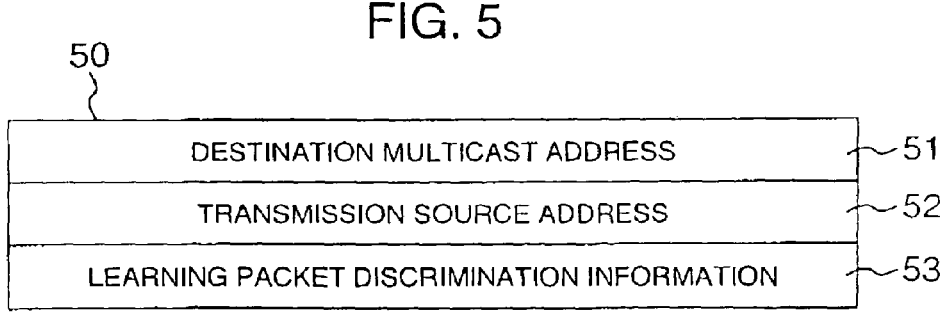
FIG. 5 is a conceptional diagram for indicating an example of a content of a learned multicast table.

In the learned multicast information table 50, as indicated in FIG. 5, a destination multicast address 51, a transmission source address 52, and learning packet discrimination information 53 are registered in correspondence with each other. The destination multicast address 51 corresponds to a destination address of a learned multicast packet by a multicast learning process operation. The transmission source address 52 corresponds to a transmission source address of a learned multicast packet by a multicast learning process operation. Both the destination multicast address 51 and the transmission address 52 are provided so as to be made in correspondence with these addresses of the multicast table 30 and the multicast learning table 40. In the learning packet discrimination information 53, information related to a learned multicast packet is registered. In the case that the valid/invalid flag 46 of the multicast learning table 40 is invalid, when such a multicast packet is received, the destination multicast address 41 and the transmission source address 42 of which are identical to those of the learned multicast packet which is registered into the multicast learning table 40, the information related to the learned multicast packet is additionally registered into the learning packet discrimination information 53. This learning packet discrimination information 53 is employed so as to discriminate as to whether or not the multicast packet received by the information relay apparatus 101 has already been learned.

Similar to the multicast table 30, the transmission source address 52 is required, and is not required, depending upon a protocol corresponding to the multicast protocol processing unit 114.

Subsequently, a description will now be made of a relay processing operation of a multicast packet, executed in the information relay apparatus 101 according to the embodiment of the present invention.

In the above-described description, a learning process operation of an IP (Internet Protocol) multicast equal to the multicast protocol used in the TCP/IP will now be described as one example of the multicast learning process operation of the information relay apparatus 101. In this TCP/IP, protocols having different versions such as the IPv4 (Internet Protocol version 4) and the IPv6 (Internet Protocol version 6) are present.

However, these IPv4 multicast and IPv6 multicast are not discriminated with respect to the versions thereof, but are simply expressed as an "IP multicast" in the below-mentioned description. Then, in the case that there is no specific designation, it is so assumed that the multicast learning process operation is carried out in a similar manner in any of these protocols.

As to the IP multicast, an IP multicast table 60 (see FIG. 6), an IP multicast learning table 70 (see FIG. 7), and a learned IP multicast information table 80 (see FIG. 8) correspond to the multicast table 30, the multicast learning table 40, and the learned multicast information table 50, respectively.

As indicated in FIG. 6, in the IP multicast table 60, the destination multicast address 31 and the transmission source address 32 of the multicast table 30 correspond to a destination IP multicast address 61 and a transmission source IP address 62, respectively. Similar to the multicast table 30, as to other information, a reception VLAN-ID 63, a plurality of transmission VLAN-IDs 64, and a transmission port list 65 are registered.

As shown in FIG. 7, in the IP multicast learning table 70, the destination multicast address 41, the transmission source address 42 and the reception packet information 45 of the multicast learning table 40 correspond to a destination IP multicast address 701, a transmission source IP address 702, and a learning packet TTL 705, respectively. A value indicative of a relay limit number in an IP header, for instance, a TTL in an IPv4 header, or a value of Hop Limit in an IPv6 header is registered into the learning packet TTL 705. It is now assumed that while an area indicative of a relay limit number in an IP header is described as a TTL, a TTL value is expressed in the case of an IPv4 header and a Hop Limit value is expressed in the case of an IPv6 header.

Also, the packet rewrite information 49 corresponds to a TTL subtraction number 709 and a transmission source second layer address 710. The TTL subtraction number 709 is used to rewrite a TTL area of an IP header, and is equal to such a value obtained by subtracting TTL before being rewritten from TTL after being rewritten. There is an object to reduce a traffic of a network in such a manner that the TTL subtraction number is subtracted from the TTL value of the received multicast packet, and thereafter, this multicast packet is repeated. The transmission source second layer address 710 corresponds to an address at a second layer (data link layer) of an OSI reference model, and also corresponds to a transmission source address which is rewritten while executing a repeating process operation of an IP multicast packet of an IP multicast. The address in this second layer is equal to, for example, a MAC (Media Access Control) address in the Ethernet ("Ethernet" being registered trademark owned by Xerox cooperation). It should be noted that the IP multicast does not depend upon the protocol of the second layer (data link layer). Similar to the multicast learning table 40, as to other information, a representative reception VLAN-ID 703, a representative reception port 704, a valid/invalid flag 706, a plurality of transmission ports 707, and a transmission LAN-ID 708 are registered.

Figure 8:
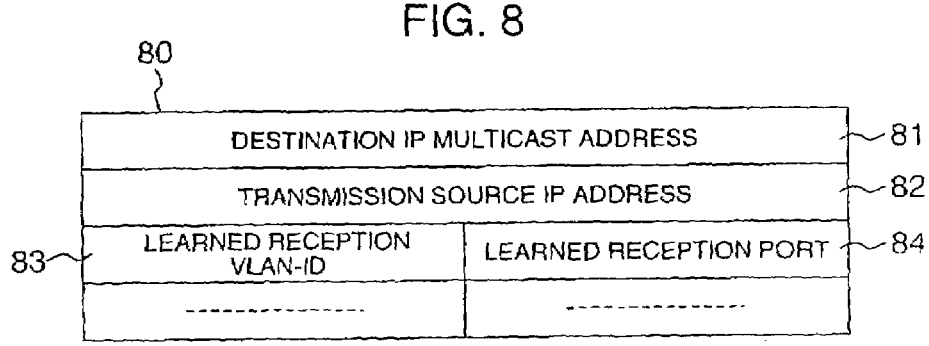
FIG. 8 is a conceptional diagram for showing an example of a content of a learned IP multicast information table.

As indicated in FIG. 8, in the learned IP multicast information table 80, a destination IP multicast address 81 is registered in correspondence with the destination multicast address 51 employed in the learned multicast information table 50; a transmission source IP address 82 is registered in correspondence with the transmission source address 52; and both a learned reception VLAN 83 and a learned reception port 84 are registered in correspondence with the learning packet discrimination information 53. A plurality of reception VLANs 83 and a plurality of learned reception ports 84 are provided per a single set of destination IP multicast address 81 and a single set of transmission source IP address 82. In the case that the valid/invalid flag of the IP multicast learning table 70 is invalid, the learned reception VLAN-ID 83 is equal to a VLAN-ID of such a VLAN which receives the multicast packet whose destination IP multicast address 81 and transmission source IP address 82 are identical to those of the learned multicast packet registered in the IP multicast learning table 70. The learned reception port 84 corresponds to such a port through which the multicast packet is received from the learned reception VLAN.

Operation of Information Relay Apparatus 101

First of all, operations of the multicast reception processing unit 111 will now be described with reference to a flow chart of FIG. 9.

A check is made as to whether or not a received packet is equivalent to a multicast packet (step 91). When the received packet corresponds to the multicast packet, another check is made as to whether or not this multicast packet corresponds to a multicast protocol packet (step 92). When the received packet is not equal to the multicast packet, the relay process operation of the normal packet is carried out. A multicast protocol packet is such a packet used to a control protocol for a multicast packet. As this control protocol, for instance, in FIG. 1, there is such a protocol used to determine that a table for relaying a multicast packet from the VLAN-A to the VLAN-B is provided in which information relay apparatus 101. By using this control protocol, the multicast relay process operation is carried out. It should be understood that apparently, the multicast protocol packet does not constitute a learning subject.

In the case that the multicast packet corresponds to the multicast protocol packet, a predetermined multicast protocol process operation is carried out (step 94). To the contrary, when the multicast packet is not equivalent to the multicast protocol packet, a multicast relay process operation defined at a step 93 of a flow chart shown in FIG. 10 (will be discussed later) is carried out in the multicast relay processing unit 112.

Next, a description will now be made of the multicast relay process operation executed at this step 93.

Figure 10:
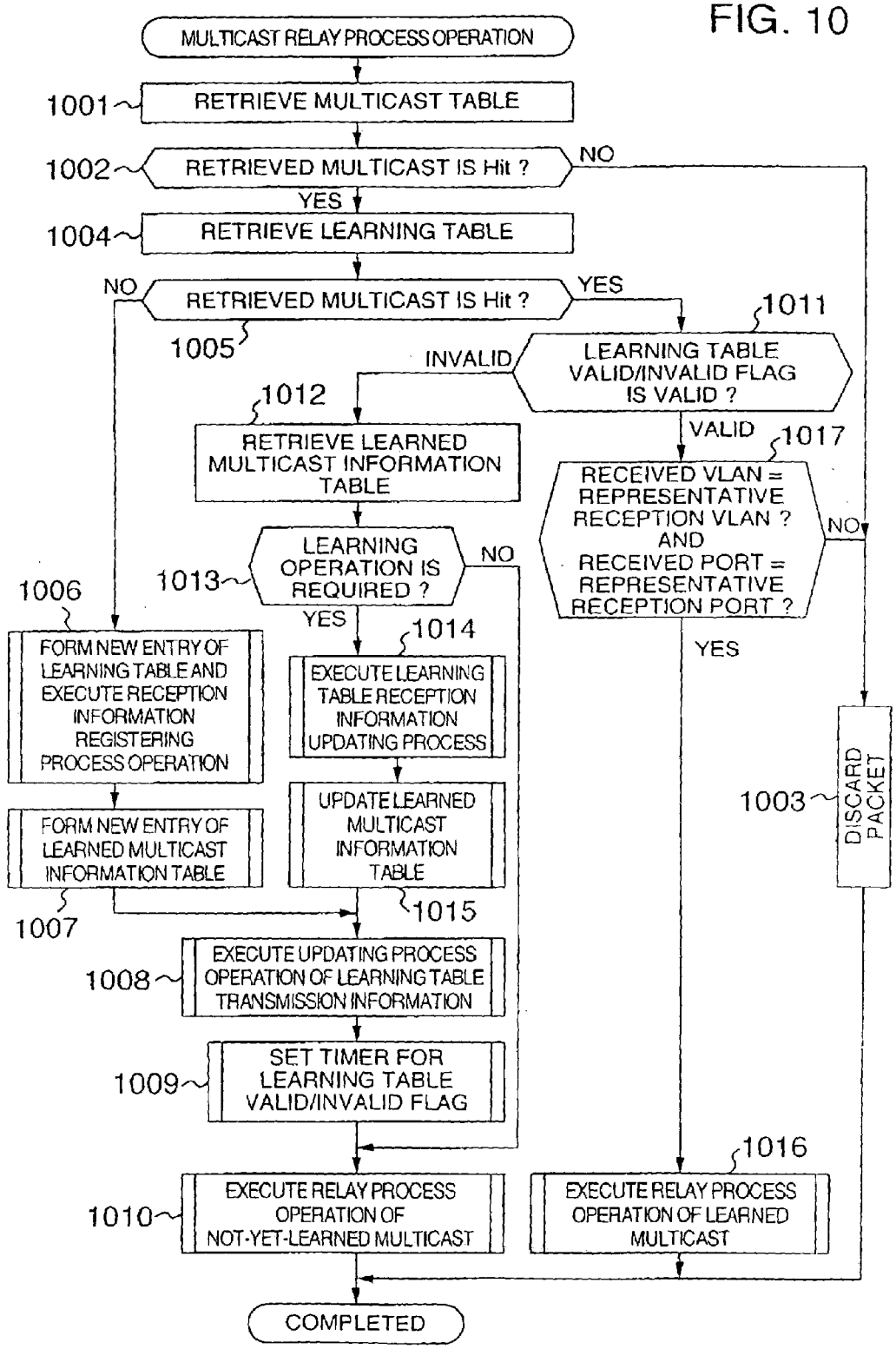
FIG. 10 is a flow chart for describing an example of a multicast relay process operation.

An example of this multicast relay process operation is indicated in FIG. 10. This multicast relay process operation is carried out by the multicast relay process operation 112.

Based upon the destination IP multicast address 61, the transmission source IP address 62, and the reception VLAN-ID 63 of the received multicast packet, the IP multicast table 60 is retrieved (step 1001).

When the retrieving operation of the IP multicast table 60 is not hit (step 1002), since the received multicast packet corresponds to such a multicast packet which is not required to be relay-processed by the own information relay apparatus 101, this multicast packet is discarded (step 1003).

To the contrary, when the retrieving operation of the IP multicast table 60 is hit (step 1002), the IP multicast learning table 70 is retrieved (step 1004). In this retrieving operation, both the destination IP multicast address 701 and the transmission source IP address 702 of the IP multicast learning table 70 are retrieved based upon the destination multicast address and the transmission source address of the received multicast packet.

In such a case that the retrieving operation of the IP multicast learning table 70 is not hit (step 1005), a new entry of the IP multicast learning table 70 is formed, and a registering process operation of reception information is carried out (step 1006). The reason why this registering process operation is carried out is given as follows: Such a multicast packet whose destination IP multicast address 701 and transmission source IP address 702 are identical to those of the received multicast packet is not yet learned. A new entry is formed in the IP multicast learning table 70, and both the destination multicast address and the transmission source address of the received multicast packet are registered into this new entry. The received port is registered into the representative reception port 704. When the received port corresponds to the learning valid port, a VLAN-ID of a learning VLAN is registered into the representative reception VLAN-ID 703, whereas when the received port is not equal to the learning valid port, a VLAN-ID of a received VLAN is registered into the representative VLAN-ID 703. The TTL value contained in the IP header of the received multicast packet is registered into the learning packet TTL 705.

Next, a new entry of the learned IP multicast information table 80 is formed (step 1007). A new entry is formed in the learned IP multicast information table 80. A destination multicast address, and a transmission source address of a received multicast packet, a VLAN-ID of a received VLAN, and a received port are registered into a destination IP multicast address 81, a transmission source IP address 82, a learned reception VLAN-ID 83, and a learned reception port 84 of this new entry, respectively.

Figure 13:
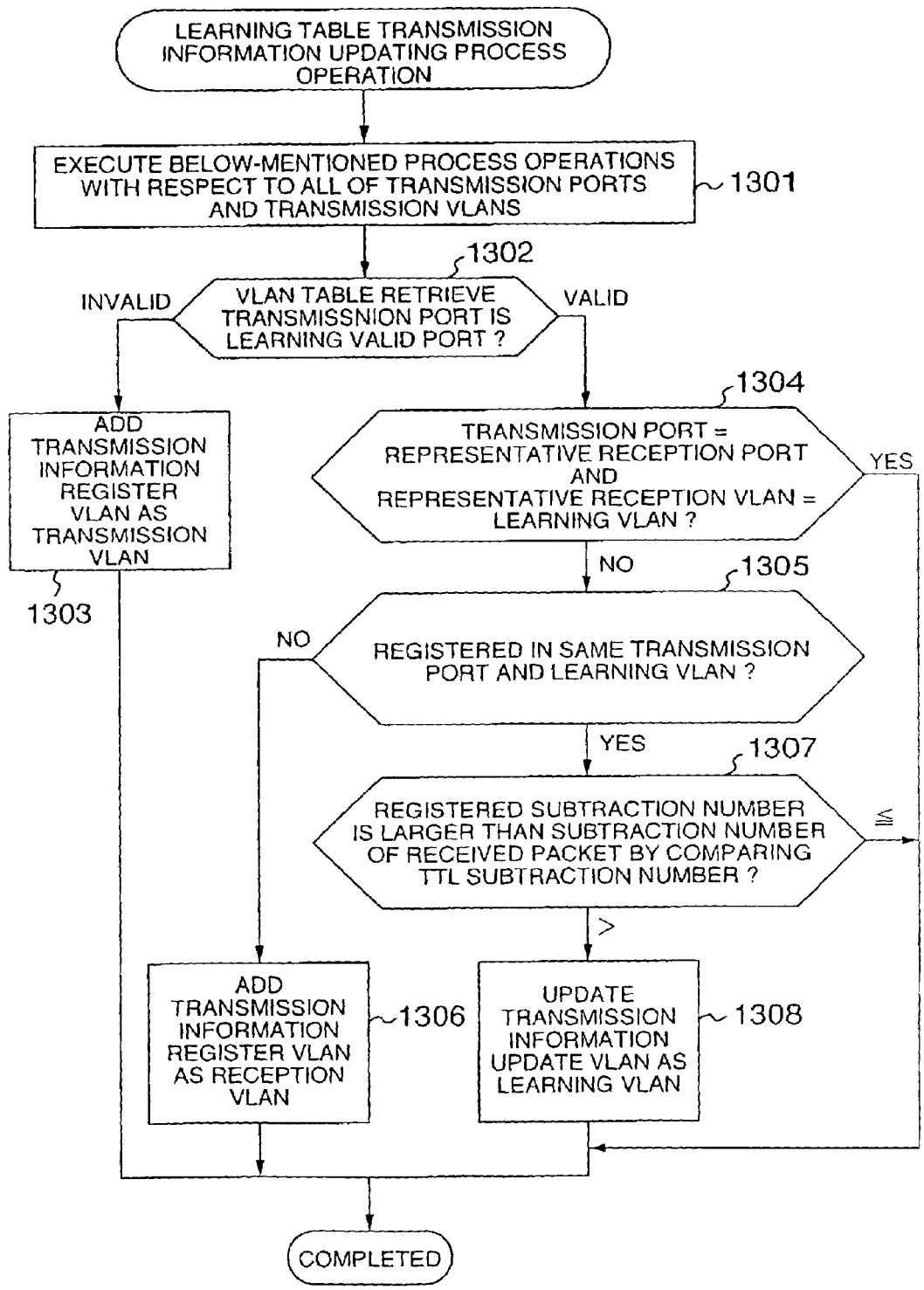
FIG. 13 is a flow chart for explaining an example of a transmission information updating process operation of the multicast learning table.

Subsequently, a transmission information updating process operation (step 1008) of the IP multicast learning table 70 is carried out which is indicated in a flow chart of FIG. 13 and will be discussed later. Thereafter, a newly formed valid/invalid flag 706 of the IP multicast learning table 70 is set to an "invalid" state, and a timer is set (step 1009). This timer owns a function capable of changing this valid/invalid flag 706 into a "valid" state after a predetermined time period has passed. As a consequence, after a predetermined time period has passed, the newly formed entry of the IP multicast learning table 70 becomes valid.

Figure 12:
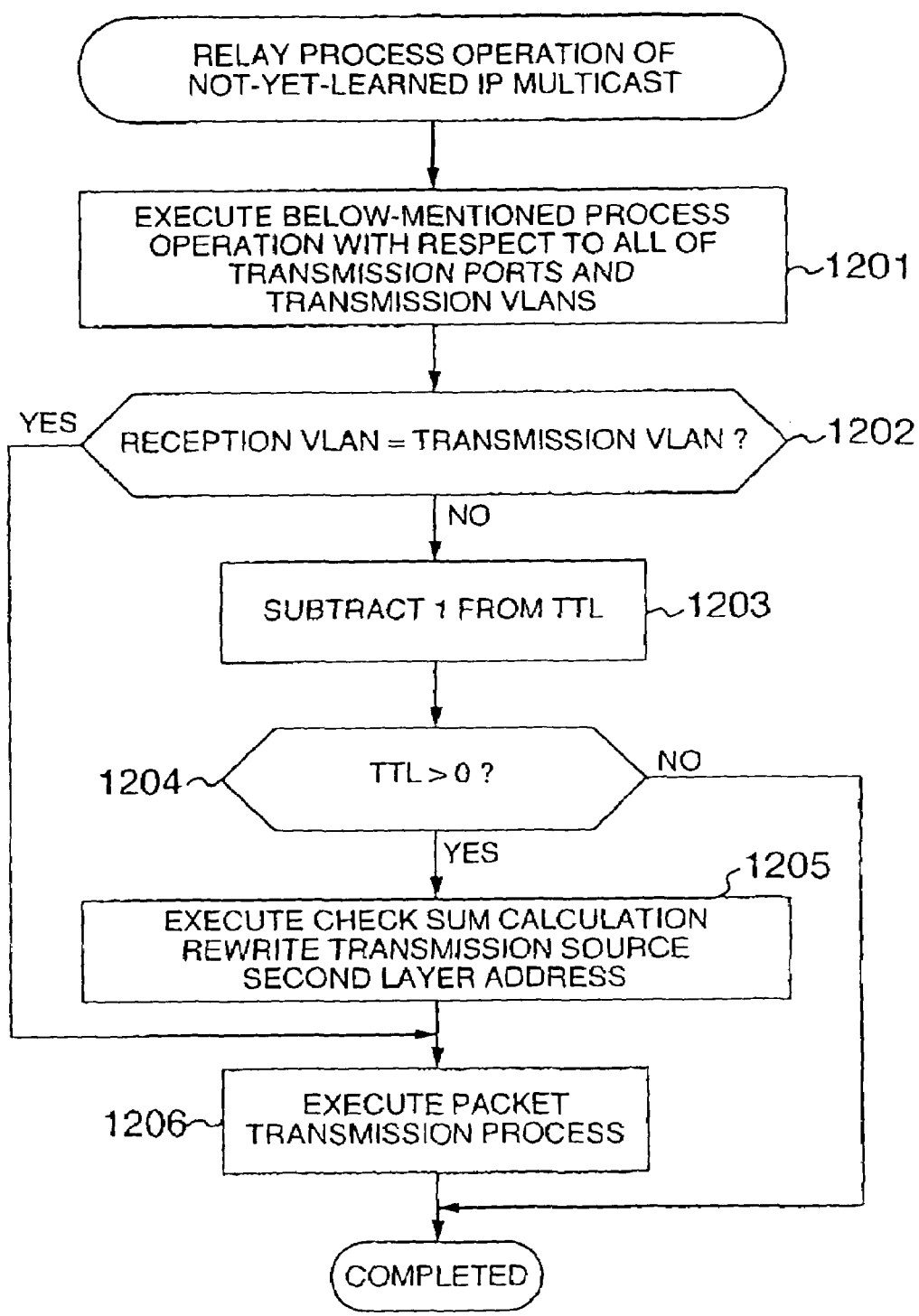
FIG. 12 is a flow chart for describing an example of a relay process operation of a not-yet-learned IP multicast.

Finally, a relay process operation (step 1010) of a multicast packet is carried out by executing a relay process operation of a not-yet-learned multicast, which is indicated in a flow chart of FIG. 12 and will be discussed later.

It should be noted that the sequential order of both the process operations (step 1006) for forming the new entry of the IP multicast learning table 70 and also for registering the reception information, and the process operation (step 1007) for forming the new entry of the learned IP multicast information table 80 may be preferably replaced with each other.

On the other hand, in the case that the retrieving operation of the IP multicast learning table 70 is hit (step 1005) and furthermore the valid/invalid flag 706 of the hit table entry is invalid (step 1011), a retrieving operation of the learned IP multicast information table 80 is carried out (step 1012).

In this case, since the valid/invalid flag 706 is invalid, the learning operation as to the IP multicast learning table 70 is not yet accomplished. At this step 1012, the learned IP multicast information table 80 is retrieved, and this table 80 contains both the destination IP multicast address 81 and the transmission source IP address 82, which are made coincident with both the destination multicast address and the transmission source address of the received multicast packet. Another retrieving operation is carried out as to whether the VLAN-ID of the reception VLAN of the multicast packet and the reception port are made coincident with a learned reception VLAN-ID 83 and a learned reception port 84, which are registered in this learned IP multicast information table 80.

As a result of the retrieving operation as to the learned IP multicast information table 80 (step 1012), in such a case that both the VLAN-ID and the reception port of the reception VLAN are made in correspondence with those of the learned reception VLAN, but are not registered as the learned reception VLAN-ID 83 and the learned reception port 84, it is so judged that the learning operation is required for the multicast packet (step 1013). Then, a reception information updating process operation of the multicast learning table is carried out (step 1014) which is indicated in a flow chart of FIG. 11 (which will be discussed later).

Furthermore, both the reception VLAN and the reception port of the received multicast packet are additionally registered into entries of the learned IP multicast information table 80 (step 1015) in correspondence with the destination multicast address and the transmission source address of the received multicast packet. These entries of the learned IP multicast information table 80 correspond to the destination multicast address and the transmission source address of the received multicast packet.

Thereafter, the above-described process operations defined at the step 1008, the step 1009, and the step 1010 are carried out. It should also be noted that both the reception information updating process operation of the multicast learning table (step 1014), and the entry adding/registering operation of the learned IP multicast information table 80 (step 1015) may be preferably replaced by each other.

As a result of the retrieving operation as to the learned IP multicast information table 80 (step 1012), in such a case that both the VLAN-ID and the reception port of the reception VLAN are made in correspondence with those of the learned reception VLAN, and further are registered as the learned reception VLAN-ID 83 and the learned reception port 84 (step 1013), it is so judged that the learning operation is not required for the multicast packet, and then, only a relay process operation of the not-yet-learned multicast is carried out (step 1010). In this case, the reason why the learning operation is not required is given as follows: Such a multicast packet, the destination IP multicast address and the transmission source IP address of which are identical to those of the received multicast packet, has been received from the same representative reception port, and also has been relayed via the same path.

Figure 14:
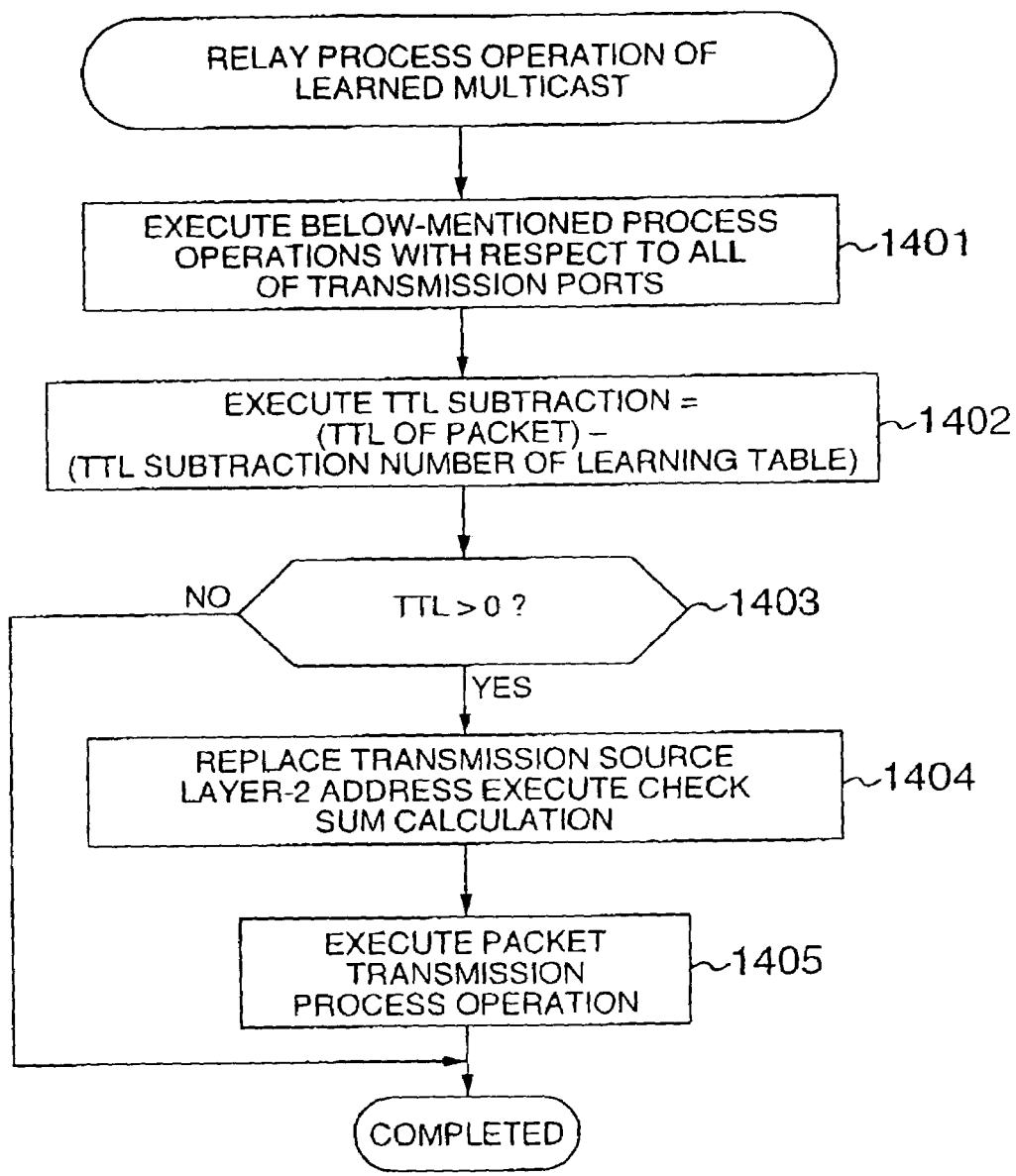
FIG. 14 is a flow chart for describing an example of a relay process operation of a learned IP multicast.

On the other hand, a description will now be made of another case that the valid/invalid flag 706 of the IP multicast learning table 70 is valid (step 1011). In this case, the learning operation is completed. In such a case that a VLAN-ID and a reception port of a reception VLAN of a received multicast packet are made coincident with the representative reception VLAN-ID 703 and the representative reception port 704, which are registered in the IP multicast learning table 70 (step 1017), a relay process operation of the learned multicast packet, which is indicated in FIG. 14 (which will be explained later), is performed while using an entry of the IP multicast learning table 70 (step 1016).

In such a case that a VLAN-ID and a reception port of a reception VLAN of a received multicast packet are not made coincident with the representative reception VLAN-ID 703 and the representative reception port 704, which are registered in the IP multicast learning table 70 (step 1017), the received multicast packet is discarded (step 1003). Since the learning operation is accomplished, such a multicast packet received from either the reception VLAN or the reception port, which are not registered in the IP multicast learning table 70 may become such a multicast packet which is not required to be relayed.

Figure 9:
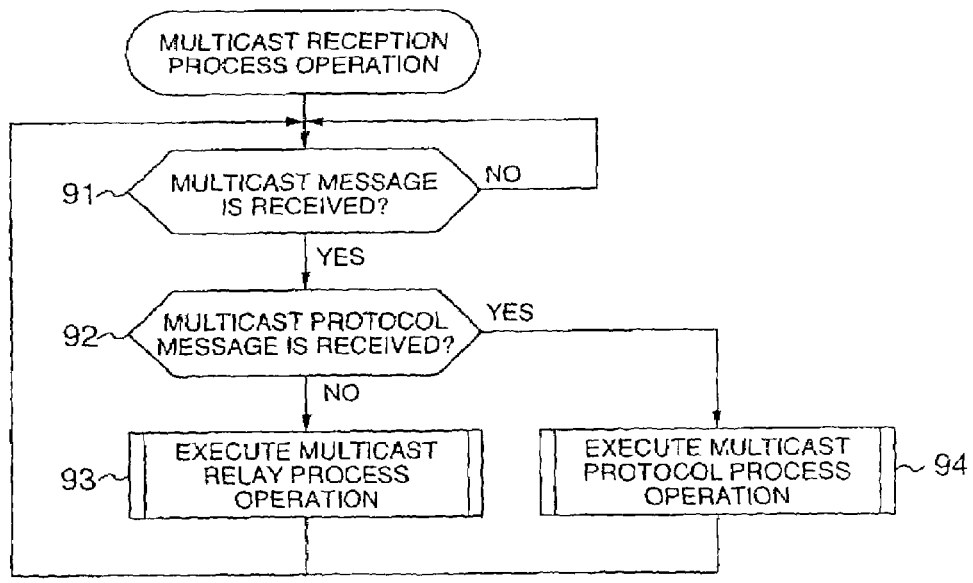
FIG. 9 is a flow chart for describing an example of a multicast reception process operation.

The above-explained operations correspond to one example of the multicast relay process operation executed at the step 93 of the flow chart of FIG. 9.

Figure 11:
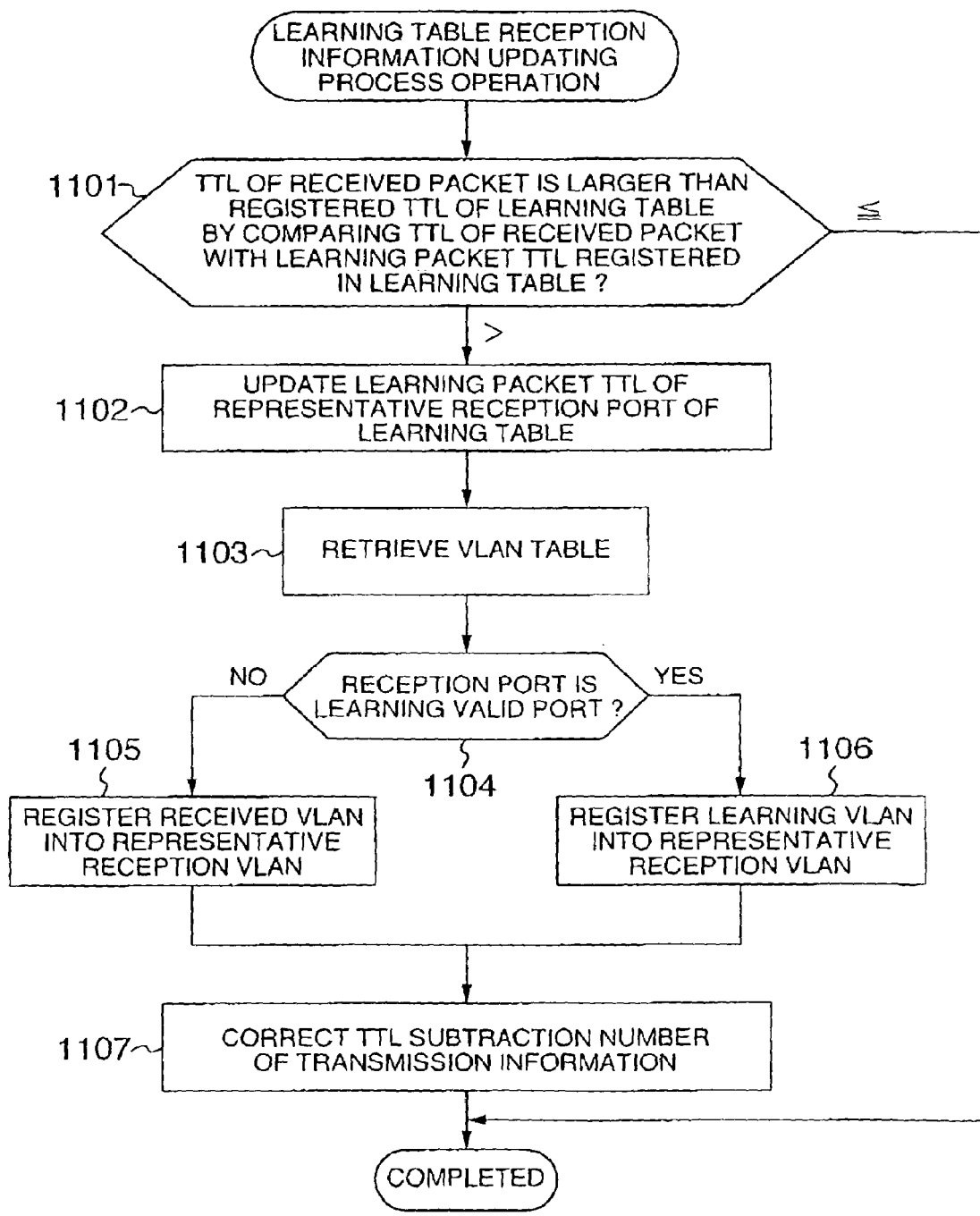
FIG. 11 is a flow chart for explaining an example of a reception information updating process operation of the multicast learning table.

Next, referring now to a flow chart of FIG. 11, a description is made of the reception information updating process operation of the multicast learning table executed at the step 1014 of FIG. 10.

First, a TTL value of an IP header of a received multicast packet is compared with the learning packet TTL value which has been registered in the IP multicast learning table 70 (step 1101).

When the TTL value of the received multicast packet is smaller than, or equal to the learning packet TTL value, no specific process operation is carried out, and the updating process operation is advanced to a step 1015 shown in FIG. 10.

In the case that the TTL value of the received multicast packet is larger than the learning packet TTL value, the TTL value of the received multicast packet is changed into the value of the prior learning packet TTL as a learning packet TTL 705 of the IP multicast learning table 70, which will be registered. Furthermore, the reception port of the received multicast packet is registered as a representative reception port 704 (step 1102).

Next, the VLAN table 20 is retrieved (step 1103). As a result of this retrieve operation, in the case that the reception port corresponds to the reception VLAN of the received multicast packet is not equal to the learning valid port (step 1104), the VLAN-ID of the reception VLAN of the received multicast packet is registered into the representative VLAN-ID 703 of the IP multicast learning table 70 (step 1105). In the case that the reception port corresponds to the reception VLAN of the received multicast packet is equal to the learning valid port (step 1104), the VLAN-ID of the reception VLAN of the received multicast packet is registered into the representative VLAN-ID 703 of the IP multicast learning table 70 (step 1106).

Finally, the TTL subtraction number 709 which has been registered as transmission information of the IP multicast learning table 70 is changed into such a value obtained by adding the prior learning packet TTL value to a difference between the TTL value of the received multicast packet and the prior learning TTL value (step 1107).

The above-explained operations are one example of the reception information updating process operation of the IP multicast learning table 70 executed at the step 1014, shown in FIG. 10.

Subsequently, a relay process operation of a not-yet-learned multicast packet defined at the step 1010 of FIG. 10 will now be described with reference to a flow chart of FIG. 12.

First of all, in accordance with the retrieve result of the IP multicast table 60 defined at the step 1001 of FIG. 10, the below-mentioned process operation is carried out with respect to all of the transmission VALNs and the transmission ports, which are registered in the transmission information of the IP multicast table 60 (step 1201).

In such a case that the reception VLAN of the received multicast packet is different from such a VLAN which will be then transmitted (step 1202), a TTL value contained in an IP header of a multicast packet is subtracted by 1, namely [(TTL value)−1] (step 1203).

If the subtracted TTL value is larger than "0" (namely TTL>0) at a step 1204, then a check sum calculation of the IP header is carried out in connection with the TTL subtraction. Also, an address of a transmission source second layer (data link layer) of a multicast packet is changed into an address corresponding to the VLAN which will be transmitted (step 1205). In this case, a check sum calculation implies, for instance, an error check. It should be understood that the check sum calculation is carried out when an IPv4 multicast is performed, whereas the check sum calculation process is no longer required when an IPv6 multicast is carried out (it is now assumed that as to the check sum calculation, this calculation process is carried out only in the IPv4 multicast in the below-mentioned description).

After the process operation defined at the step 1205, a packet transmission process operation defined at a step 1206 is carried out. This packet transmission process operation corresponds to such a process operation that the communication process unit 110 provided in the information relay apparatus 101 transmits a multicast packet via a predetermined transmission port to a predetermined transmission VLAN.

On the other hand, in the case that a reception VLAN of a received multicast packet is identical to a VLAN which is transmitted (step 1202), since a multicast packet contained in the same VLAN is relayed, a TTL value is not subtracted. This may satisfy such an object that conventionally, a router for connecting different segments to each other does not subtract a TTL value while hosts belonging to the same segment transmit and receive a packet. As a consequence, in this case, the process operations defined at the above-described steps 1203, 1204, and 1205 are not carried out, but the packet transmission process operation defined at the step 1206 is carried out.

On the other hand, in the case that the subtracted TTL value is not larger than "0" (namely, TTL≦0) at the step 1204, the relay process operation is accomplished without executing the above-described process operations defined at the steps 1205 and 1206.

The above-explained process operations correspond to one example of the relay process operation of the not-yet-learned multicast defined at the step 1010 of FIG. 10.

Referring now to a flow chart shown in FIG. 13, a description will be made of the transmission information updating process operation of the IP multicast learning table 70 defined at the step 1008 shown in FIG. 10.

First of all, in accordance with the retrieve result of the IP multicast table 60 defined at the step 1001 of FIG. 10, the below-mentioned process operation is carried out with respect to all of the transmission VLANs and the transmission ports, which are registered in the IP multicast table 60 (step 1301).

A first description will now be made of such a case that the VLAN table 20 is retrieved and then, a transmission port corresponding to the transmission VLAN is not equal to the learning valid port list 23 (step 1302). Entry areas with respect to a transmission port 707, a transmission VLAN-ID 708, a TTL subtraction number 709, and an address 710 of a transmission source second layer (data link layer) are newly formed, and registered in the transmission information of the IP multicast learning table 70 in which the registering process operation of the reception information has been carried out at the step 1006, or the updating process operation of the reception information has been carried out at the step 1014 (step 1303). Both a transmission port and a VLAN-ID of a transmission VLAN, which are obtained from the retrieve result of the IP multicast table 60 are registered into the transmission port 707 and the transmission VLAN-ID 708. A difference between a TTL value of a received multicast packet and the learning packet TTL value of the IP multicast learning table 70 is calculated as follows: [(TTL value of received multicast packet)−(learning packet TTL value)].

This calculated difference is registered into the TTL subtraction number 709. In the case that the reception VLAN of the multicast packet is different from the transmission VLAN, such a value obtained by further subtracting 1 from the above-calculated difference is registered into the TTL subtraction value 709. Namely, this value is calculated as follows: [(TTL value of received multicast packet)−(learning packet TTL value)−1]. This value calculated in this manner will be expressed as a TTL subtraction number of a reception packet hereinafter. An address of a transmission source second layer (data link layer) corresponding to the transmission VLAN is registered into the address 710 of the transmission source second layer (data link layer).

A next description will now be made of such a case that the VLAN table 20 is retrieved and then, a transmission port corresponding to the transmission VLAN is equal to the learning valid port list 23 (step 1302). In such a case that a transmission port of a retrieve result is made coincident with the representative reception port 704 of the IP multicast learning table 70 and further, the representative reception VLAN-ID 703 is equal to a VLAN-ID of a learning VAN (step 1304), the transmission information updating process operation of the IP multicast learning table 70 is ended without performing the below-mentioned process operation. In this case, since the representative reception VLAN-ID 703 is equal to the VLAN-ID of the learning VLAN, the own information relay apparatus 101 is connected to another information relay apparatus 101 having a learning function. As a result, in such a case that the transmission port is made coincident with the representative reception port 704, the own information relay apparatus 101 need not transmit a multicast packet to another information relay apparatus 101, but also need not execute the following process operation. It should also be noted that when the representative reception VLAN-ID 703 is not equal to the VLAN-ID of the learning VLAN, any one of the terminal 104 and another information relay apparatus without having a learning function is connected to the own relay apparatus 101.

On the other hand, in the case that the transmission port is not made coincident with the representative reception port 704, or the representative reception VLAN-ID 703 is not equal to the VLAN-ID of the learning VLAN (step 1304), with respect to the transmission information of the IP multicast learning table 70, a judgement is made as to whether or not a transmission VLAN-ID 708 corresponding to the transmission port 707 identical to a transmission port of a multicast packet is registered by the VLAN-ID of the learning VLAN (step 1305). In such a case that this transmission VLAN-ID 708 is not equal to the VLAN-ID of the learning VLAN (step 1305), entry areas with respect to the transmission port 707, the transmission VLAN-ID 708, the TTL subtraction number 709, and the address 710 of the transmission source second layer (data link layer) are newly formed, and registered (step 1306). The transmission port obtained from the retrieve result of the IP multicast table 60 is registered into the transmission port 707. The VLAN-ID of the learning VLAN is registered into the transmission VLAN-ID 708. The TTL subtraction number of the reception packet is registered into the TTL subtraction number. A transmission source second layer address corresponding to the learning VLAN is registered into the transmission source second layer address 710. In this case, the reason why the transmission VLAN-ID 708 is additionally registered as the VLAN-ID of the learning VLAN into the new entry of the transmission information of the IP multicast learning table 70 is given as follows: That is to say, the following case is considered. The own information relay apparatus 101 is connected to another information relay apparatus 101 having the learning function via such an information relay apparatus which does not own a function operable at a level higher than, or equal to the third layer (network layer) such as the Ethernet and the layer 2 switch.

On the other hand, in such a case that the transmission VLAN-ID 708 corresponding to the transmission port 707 identical to the transmission port of the multicast packet is equal to the VLAN-ID of the learning VLAN (step 1305), the TTL subtraction number 709 which has been registered into the IP multicast learning table 70 is compared with a TTL subtraction number of a reception packet.

When the registered TTL subtract number 709 is larger than the TTL subtract number of the reception packet (step 1307), the transmission port 707, the transmission VLAN-ID 708, the TTL subtraction number 709, and the transmission source second layer address 710, which have been registered, are updated, respectively (step 1308). With execution of this updating operation, the TTL subtraction number 709 becomes the TTL subtraction number of the reception packet, and other transmission information is similar to those before the updating operation is performed. In other words, the transmission port 707 corresponds to the transmission port obtained from the retrieve result of the IP multicast table 60. The transmission VLAN-ID 708 corresponds to the VLAN-ID of the learning VLAN. The transmission source second layer address 710 is equal to a transmission source second layer address corresponding to the learning VLAN.

Also, in such a case that the registered TTL subtraction number 709 is smaller than, or equal to the TTL subtraction number of the reception packet (step 1307), the transmission information updating process operation of the IP multicast learning table 70 is accomplished without executing the process operation defined at the step 1308.

The above-explained process operations are performed to summarize the transmission information updating process operation of the IP multicast learning table 70 defined at the step 1008 of FIG. 10.

Next, detailed operations of the learned multicast relay processing operation defined at the step 1016 shown in FIG. 10 will now be explained with reference to a flow chart of FIG. 14.

While the IP multicast learning table 70 is retrieved, the below-mentioned process operation is carried out with respect to all of the transmission ports 707 which are registered as transmission information (step 1401).

First, in accordance with the TTL subtraction numbers 709 registered in correspondence with the transmission ports, a total number of the registered TTL subtraction numbers is subtracted from a TTL value of an IP header of a multicast packet (step 1402).

As a result of this subtraction, in the case that TTL>0 (step 1403), a transmission source second layer address of the IP header of the multicast packet is replaced by the registered transmission source second layer address 710 corresponding to the transmission port. Also, a check sum calculation is again carried out in connection with the TTL subtraction (step 1404). Thereafter, the communication processing unit 110 transmits the multicast packet from the information relay apparatus 101 via the registered transmission VLAN 708 (step 1405).

When it is not equal to TTL>0 at the step 1403, the process operations defined at the step 1404 and the step 1405 are not carried out.

The above-described operations correspond to one example of the relay process operation for the learned multicast, executed in the step 1016.

Next, an information network is constructed with employment of the above-explained information relay apparatuses. An example of an IP multicast communication is represented by using this information network.

Figure 15:
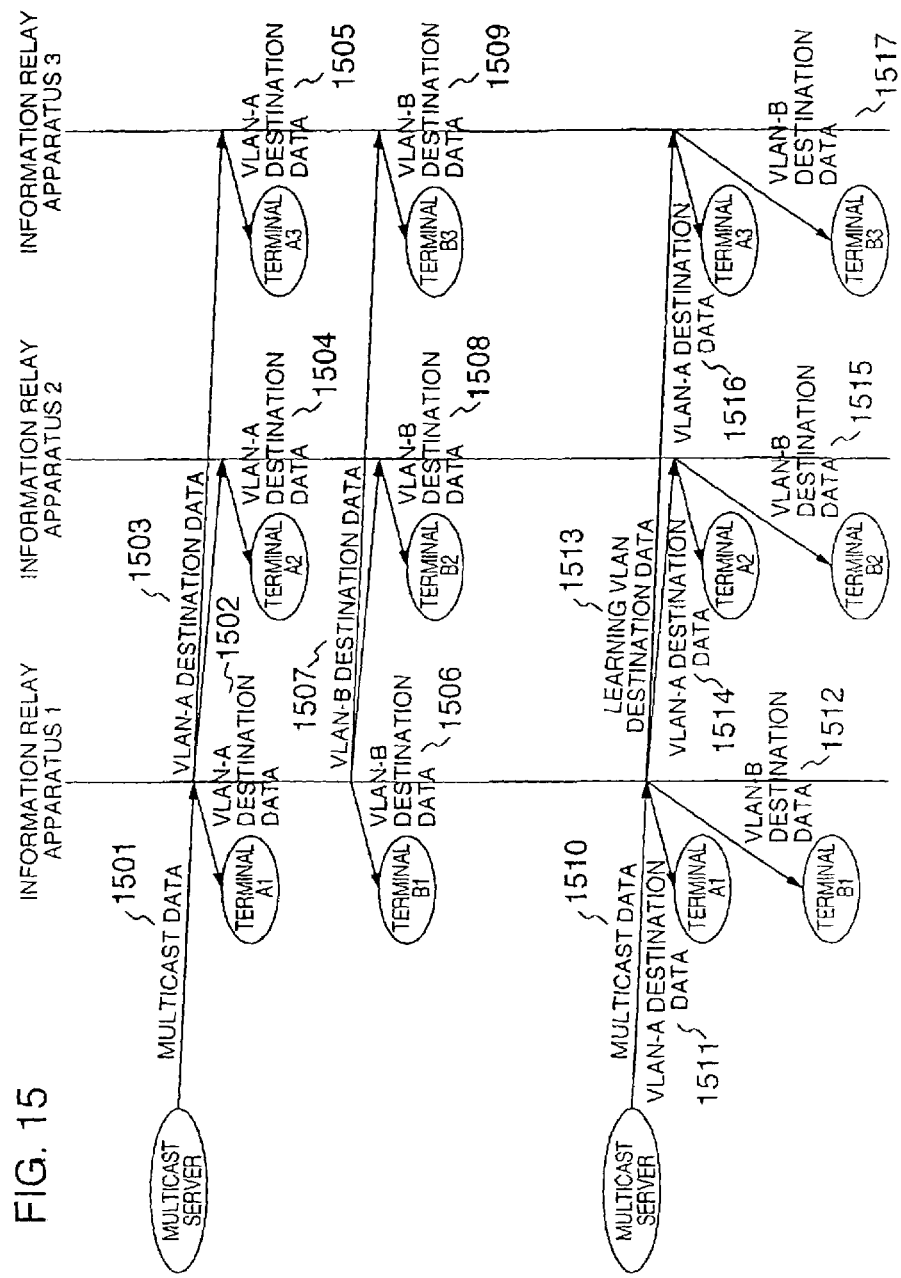
FIG. 15 is a conceptional diagram for indicating an example of a packet flow of an IP multicast communication executed in an information network containing the information relay apparatus according to the present invention.

FIG. 15 illustratively shows an example of a packet flow of an IP multicast communication executed in the information network of FIG. 1. In the information network of FIG. 1, the multicast server 103 belongs to the VLAN-A (102-1). It is now assumed that both the terminal 104 (terminal A1, terminal A2, terminal A3) belonging to the VLAN-A (102-1) and the terminal 104 (terminal BE, terminal B2, terminal B3) belonging to the VLAN-B (102-2) are joined to an IP multicast group member corresponding to a destination of IP multicast data transmitted by the multicast server 103, respectively. It is also assumed that the port 4, the port 7, and the port 10 belong to both of the VLAN-A and the VLAN-B, and also are equal to the learning valid ports, respectively. Further, it is assumed that such an IP multicast table 60 used to relay the multicast packet from the VLAN-A (102-1) to the VLAN-B (102-2) among the IP multicast tables 60 owned in the respective information relay apparatuses 101 is owned by an information relay apparatus 1.

First, the multicast server 103 transmits multicast data 1501. The information relay apparatus 1 forms a new entry of an IP multicast learning table 1230 with respect to a new IP multicast address which is received from the VLAN-A (102-1), and registers reception information into this new entry (step 1006). At this time, a reception port 1 in the received VLAN-A (102-1) is not equal to the learning valid port, but the VLAN-ID of the VLAN-A (102-1) is registered as the representative reception VLAN-ID 703.

Next, as a result of the retrieving operation of the IP multicast table 60 (step 1001), a relay process operation within the VLAN-A (102-1) is firstly carried out. A registering process operation of the transmission information of the IP multicast learning table 1230 is carried out from the information relay apparatus 1 with respect to the port 3 and the port 4 present in the information relay apparatus 101, and the terminal 104 belonging to the VLAN-A (102-1) (step 1008). Direct to the VLAN-A (102-1), data 1502 is transmitted from the port 2 and also data 1503 is transmitted from the port 4. At this time, since the port 4 of the VLAN-A (102-1) corresponding to the transmission destination is equal to the learning valid port, the transmission VLAN-ID 708 is registered as the VLAN-ID of the learning VLAN (step 1306). Also, since the data is relayed within the VLAN-A (102-1), the replacement of the transmission source second layer address is not executed, but the transmission source second layer address contained in the IP header of the multicast packet is registered as the transmission information.

Subsequently, as a result of the retrieving operation of the IP multicast table 60 (step 1001), a relay process operation from the VLAN-A (102-1) to the VLAN-B (102-2) carried out A registering process operation of the transmission information of the IP multicast learning table 1230 is carried out with respect to the port 3 and the port 4 present in the information relay apparatus 101, and the terminal 104 belonging to the VLAN-B (102-2) (step 1008). Direct to the VLAN-B (102-2), data 1506 is transmitted from the port 3 and also data 1507 is transmitted from the port 4. At this time, since the port 3 corresponds to a new transmission destination, the transmission information is registered (step 1008). While the data is relayed from the VLAN-A (102-1) to the VLAN-B (102-2), the transmission source second layer address is replaced by a second layer address corresponding to the VLAN-B (102-2) within the information relay apparatus 1, and the transmission source second layer address 710 which is replaced as the transmission information is registered.

While the multicast data is relayed to the VLAN-A, the port 4 has already registered the transmission information in the learning process operations defined at the steps 1006, 1007, 1008, and 1009 (step 1302). Since the port 4 is also equal to the learning valid port, the transmission information has been registered while using the transmission VLAN-ID 708 as a VLAN-ID of a learning VLAN (step 1305). In this case, the TTL subtraction number 709 of the transmission information is updated as such transmission information having a smaller TTL subtraction number (step 1307). However, in the case of the above-explained example of the packet flow shown in FIG. 15, when the packet received from the VLAN-A is transmitted to the VLAN-B, the TTL value of this received packet is subtracted by "1" to relay the packet. Since the TTL subtraction number for the VLAN-B is larger than the TTL subtraction number 709 of the transmission information which is registered when the relay process operation for the VLAN-A is carried out, the transmission information related to the port 4 is not updated.

Finally, the timer is set (step 1009). The valid/invalid flag 706 with respect to the newly formed entry of the IP multicast learning table 70 becomes valid after a preselected time duration has passed.

In an information relay apparatus 2, the data 1503 which is transmitted to the VLAN-A (102-1) by the information relay apparatus 1 is received, a new entry of the IP multicast learning table 70 with respect to a new IP multicast address received from the VLAN-A (102-1) is formed, and then the reception information is registered (step 1006). At this time, since the port 7 of the received VLAN-A (102-1) corresponds to the learning valid port, a VLAN-ID of a learning VLAN is registered as the representative reception VLAN-ID 703.

Next, as a result of the retrieving operation (step 1001) for the IP multicast table 60, a relay process operation within the VLAN-A (102-1) is carried out. The transmission information is registered with respect to the port 5 where the terminal A2 is present (step 1008), and the data 1504 directed to the VLAN-A (102-1) is transmitted. Since the port 5 is not equal to the learning valid port (1302), a VLAN-ID of a VLAN-A is registered as to the transmission VLAN-ID 708 of the transmission information (step 1303). Since the data is relayed within the VLAN-B, as to the transmission source second layer address 710, the second layer address contained in the IP header of the multicast packet is registered. Also, a timer for the valid/invalid flag is set (step 1009).

Thereafter, the data 1507 transmitted by the information relay apparatus 1 to the VLAN-B (102-2) is received to execute the learning process operation defined at the step 1014, the step 1015, the step 1008, and the step 1009. In this case, the data identical to the data 1507 has already been received from the VLAN-A (102-1), and thus, the reception information updating process operation is carried out (step 1014). In such a case that a TTL of a received multicast packet is larger than the learning packet TTL of the IP multicast learning table 70 (step 1101), the reception information is updated (step 1102). However, in the case of the packet flow example shown in FIG. 15, since the TTL of the data 1503 sent to the VLAN-A (102-1) is larger than the TTL of the received multicast packet, the reception information related to the representative reception VLAN-ID 703, the representative reception port 704, and the learning packet TTL 705 of the IP multicast learning table 70 are not updated. Furthermore, a relay process operation within the VLAN-B (102-2) is carried out, and the transmission information is registered with respect to the port 6 where the terminal B2 is present (step 1008). The data 1508 directed to the VLAN-B (102-2) is relayed. The port 6 is not equal to the learning valid port (step 1302), a VLAN-ID of a VLAN-B (102-2) is registered as to the transmission VLAN-ID 708 of the transmission information (step 1303). Since the data is relayed within the VLAN-B (102-2), as to the transmission source second layer address 710, the second layer address contained in the IP header of the multicast packet is registered. Also, a timer for the valid/invalid flag 706 is again set (step 1009).

An operation executed in an information relay apparatus 3 is similar to the operation performed in the information relay apparatus 2, and a learning process operation is carried out. The data 1505 directed to the VLAN-A is transmitted from the port 8, and the data 1509 directed to the VLAN-B is transmitted from the port 9 (steps 1006, 1007, 1014, 1015, 1008, and 1009).

Thereafter, after the valid/invalid flag 706 of the IP multicast learning table 70 employed in each of the information relay apparatuses 101 has become valid (step 1011), the multicast server 103 transmits multicast data 1510 directed to the same destination. The information relay apparatus 1 retrieves the IP multicast learning table 70 (step 1004). Such table entries where the destination IP multicast addresses 701, the representative reception VLAN-IDs 703, and the representative reception ports 704 are made coincident with each other are hit (step 1005). In accordance with the result of this retrieving operation, a multicast packet is transmitted to the registered port 2, port 3, and port 4 (step 1405). In this case, the registered TTL subtraction number 709 is subtracted from the TTL, and the resultant TTL is replaced by the registered transmission source second layer address 710 (step 1404). Since both the port 2 and the port 3 are not equal to the learning valid ports, data 1511 directed to the VLAN-A (102-1) and data 1512 directed to the VLAN-B (102-2) are transmitted to the respected ports. Another data 1513 directed to the learning VLAN (102-3) is transmitted to the port 4.

In the information relay apparatus 2, the data 1513 directed to the learning VLAN (102-3), which is transmitted by the information relay apparatus 1, is received, and the IP multicast learning table 70 is retrieved (step 1004). With respect to a destination IP multicast address corresponding to the data 1513 directed to the learning VLAN (102-3), such a table entry that the representative reception VLAN-ID 703 is equal to the VLAN-ID of the learning VLAN is hit (step 1005). As a result of this retrieving operation, a relay process operation is carried out with respect to the registered port 5 and also the registered port 6 (step 1016). Data 1514 directed to the VLAN-A (102-1) is transmitted from the port 5, and data 1515 directed to the VLAN-B (102-2) is transmitted from the port 6.

While an operation executed in an information relay apparatus 3 is similar to the operation performed in the information relay apparatus 2, data 1516 directed to the VLAN-A (102-1) is transmitted from a port 8, and also data 1517 directed to the VLAN-B (102-2) is transmitted from a port 9 (step 1016).

The above-described operations correspond to one example of the IP multicast communication executed by the information relay apparatus 101 according to the present invention.

Figure 16:
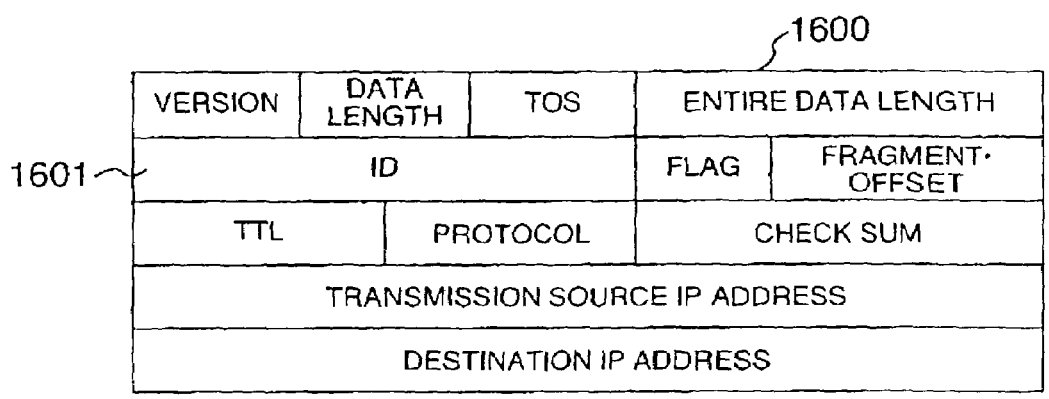
FIG. 16 is a conceptional diagram for representing an example of a header format of a multicast packet in the IPv4 multicast.

In FIG. 16, there is shown an example of a header format 1600 of a multicast packet used in the IPv4 multicast communication.

Figure 17:
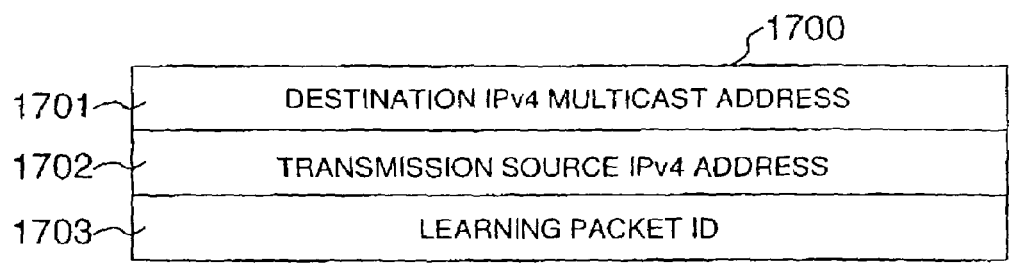
FIG. 17 is a conceptional diagram for indicating an example of a learned IPv4 multicast information table.

In the case of the IPv4 multicast communication, as the learning packet discrimination information 53 contained in the learned multicast information table 50 shown in FIG. 5, an ID 1601 contained in an IP header indicated in FIG. 16 may be preferably used. In this case, a learned IPv4 multicast information table 1700 corresponding to the learned multicast information table 50 is represented in FIG. 17. In this information table, a destination IPv4 multicast address 1701, a transmission source IPv4 address 1702, and a learning packet ID 1703 are registered in correspondence with each other. An ID value contained in an IP header is registered into the learning packet ID 1703.

Subsequently, a description will now be made of an example of operations executed in such a case that the learned IPv4 multicast information table 1700 is employed.

When the learned IPv4 multicast information table 1700 is employed, at the step 1007 defined in the multicast relay process operation of FIG. 10, an ID value of an IP header of a received multicast packet is registered into a newly formed table entry of the learned IPv4 multicast information table 1700.

In a retrieving operation for the learned IPv4 multicast information table 1700 executed at the step 1012, an ID value contained in an IP header of a received multicast packet is compared with the value of the learning packet ID 1703 of the learned IPv4 multicast table 1700.

At the step 1013, in the case that the ID value contained in the IP header is made coincident with the value of the learning packet ID 1703, it is so judged that the learning operation is required, and the process operation is advanced to a step 1014. To the contrary, at the step 1012, in the case that the ID value contained in the IP header is not made coincident with the value of the learning packet ID 1703, it is so judged that the learning operation is not required. At the step 1015, since the ID of the received multipacket is made coincident with the learning packet ID 1703, the updating process operation is not carried out.

The above-described operations correspond to one example of the operations executed in the case that the learned IPv4 multicast information table 1700 shown in FIG. 17 is employed.

Figure 18:
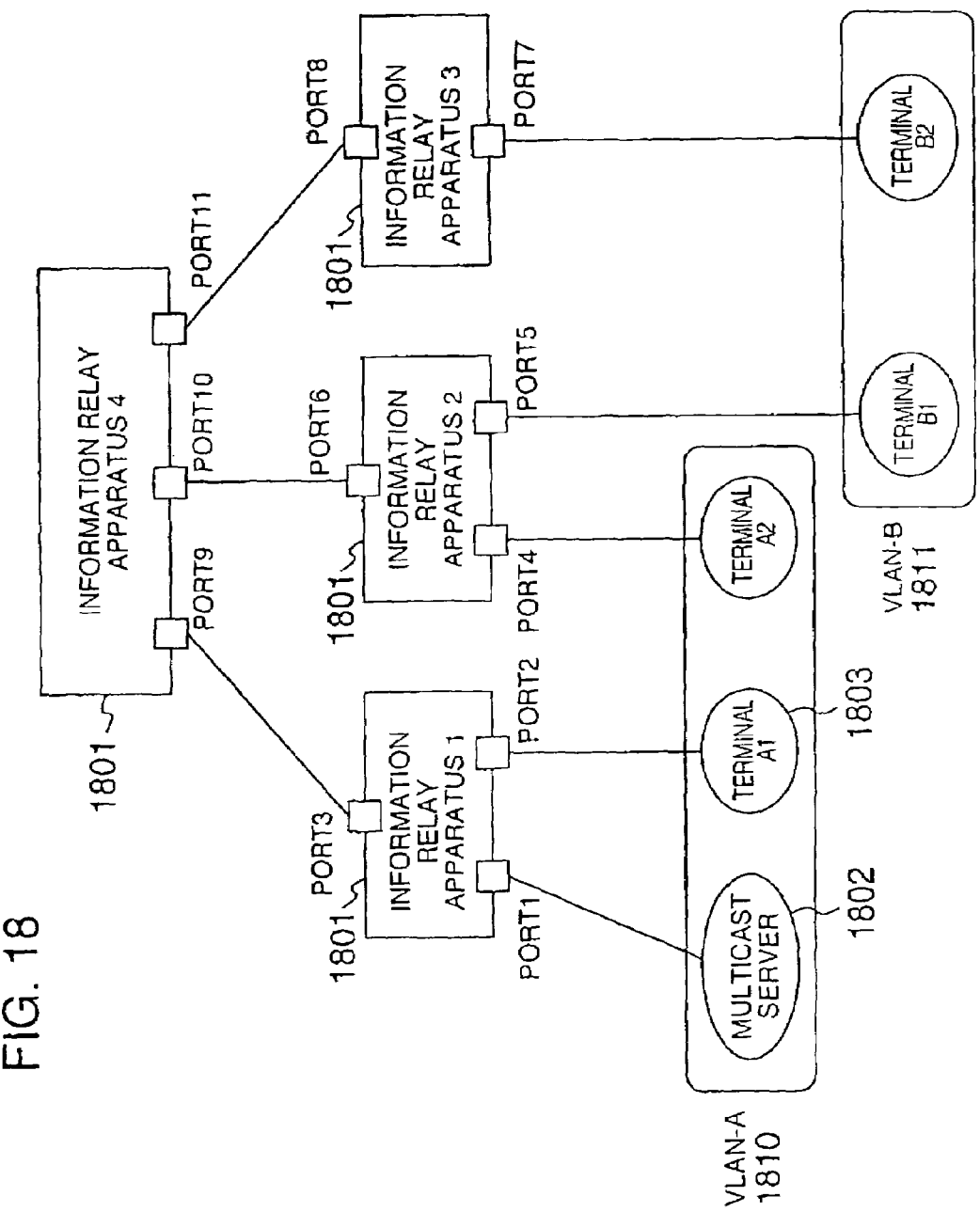
FIG. 18 is a conceptional structural diagram for indicating an information network containing another example of the information relay apparatus according to the present invention.

FIG. 18 represents one example in the case that another information network is arranged by employing the information relay apparatus 101 according to the present invention.

In the information network of FIG. 18, a plurality of information relay apparatuses 1801 (namely, information relay apparatus 1, information relay apparatus 2, and information relay apparatus 3), according to the present invention, are connected via an information relay apparatus 1801 (namely, information relay apparatus 4), similarly according to the present invention.

A multicast server 1802 and a terminal "A1" are connected to the information relay apparatus 1. The multicast server 1802 belongs to a VLAN-A (1810). Also, the terminal A1 belongs to this VLAN-A (1810), and corresponds to one of plural multicast reception terminals 1803 (terminal A1, terminal A2, terminal B1, terminal B2). Both the terminal A2 belonging to the VLAN-A (1810) and the terminal B1 belonging to a VLAN-B (1811) are connected to the information relay apparatus 2. The terminal B2 belonging to the VLAN-B (1811) is connected to the information relay apparatus 3.

It is now assumed that the terminal A1, the terminal A2, the terminal B1, and the terminal B2 are grouped in a group member of multicast data transmitted by the multicast server 1802.

Also, ports (namely, port 3, port 6, port 8, port 9, port 10, port 11) connected among the information relay apparatus 4 and the respective information relay apparatuses 1801 other than this information relay apparatus 4 belong to both the VLAN-A (1810) and the VLAN-B (1811). It is assumed that these ports are set as learning valid ports.

It is also assumed that such a multicast table 30 used to execute a relay operation from the VLAN-A (1810) to the VLAN-B (1811) among the multicast tables 30 provided in the respective information relay apparatuses 1801 is owned by the information relay apparatus 2.

Figure 19:
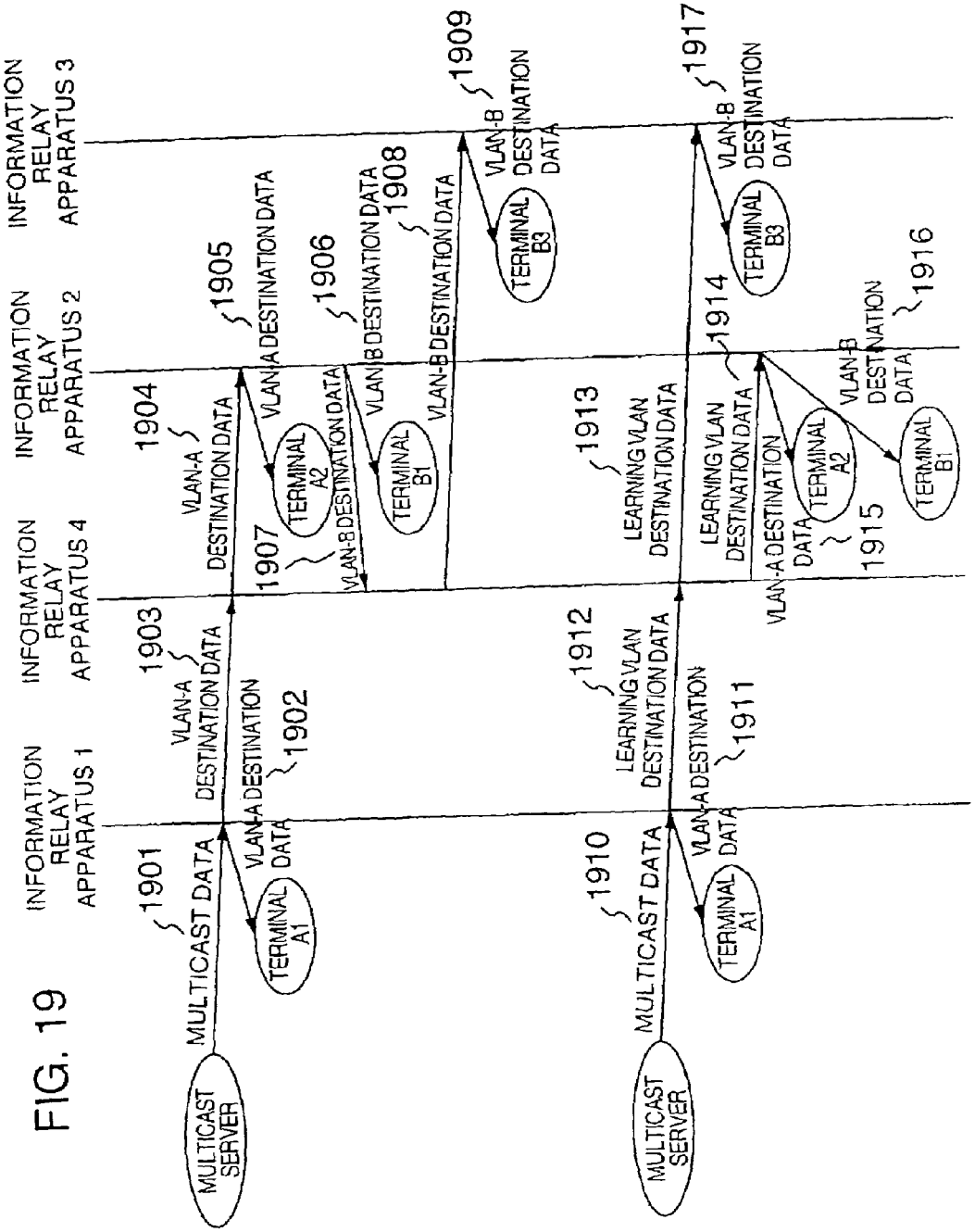
FIG. 19 is a conceptional diagram for indicating another example of a packet flow of an IP multicast communication executed in an information network containing the information relay apparatus according to the present invention.

Referring now to a packet flow shown in FIG. 19, an example of an IP multicast communication executed in the information network of FIG. 18 will be described.

First, the multicast server 1802 transmits multicast data 1901. The information relay apparatus 1 receives a multicast packet from the VLAN-A (1810) via the port 1. With respect to a destination IP multicast address of the newly received multicast packet, a new entry of the IP multicast learning table 70 is formed, and reception information is registered in this newly formed entry (step 1006). At this time, since the port 1 is not equal to the learning valid port, the VLAN-ID 21 of the VLAN-A (1810) is registered into the representative reception VLAN-ID 703.

Next, based upon a result of the retrieving operation (step 1001) of the IP multicast table 60, a replay process operation within the VLAN-A (1810) is carried out. The transmission information of the IP multicast learning table 70 is registered from the information relay apparatus 1 with respect to the port 2 and the port 3 where the terminals belonging to the VLAN-A (1810) and the information relay apparatus 1 are present (step 1008).

Data 1902 is transmitted from the port 2, and also data 1903 is transmitted from the port 3 to the VLAN-A (1810). At this time, since the port 2 of the VLAN-A (1810) corresponding to the transmission destination is not equal to the learning valid port (step 1302), the VLAN-ID 21 of the VLAN-A (1810) is registered as the transmission VLAN-ID 708 (step 1301). Since the relay process operation is carried out within the VLAN-A (1810), a second layer address contained in an IP header of a multicast packet is registered as the transmission source second layer address 710. Since the port 3 of the transmission destination is equal to the learning effective port (step 1302), the VLAN-ID 21 of the learning VLAN is registered as the transmission VLAN-ID 708 (step 1306), and further, similar to the port 2, the second layer address contained in the IP header is registered into the transmission source second layer address. Also, a timer is set (step 1009). This timer is provided so as to set the valid/invalid flag 706 to a valid state after a preselected time period has elapsed. This valid/invalid 706 is provided with respect to the newly formed entry of the IP multicast learning table 70.

In the information relay apparatus 4, the data 1903 directed to the VLAN-N (1810), which is transmitted by the information relay apparatus 1, is received from the port 9. A new entry of the IP multicast learning table 70 is formed with respect to the destination IP multicast packet which is newly received from the VLAN-A (1810), and then the reception information is registered into this formed entry (step 1006). At this time, since the port 9 of the received VLAN-A (1810) is equal to the learning valid port (step 1302), the VLAN-ID 21 of the learning VLAN is registered as the representative reception VLAN-ID 703 (step 1306).

Next, based upon a result of the retrieving operation (step 1001) of the IP multicast table 60, a replay process operation within the VLAN-A (1810) is carried out. The transmission information of the IP multicast learning table 70 is registered with respect to the port 10 where the relay apparatus 2 belonging to the VLAN-A (1810) is present (step 1008). The data 1904 directed to the VLAN-A (1810) is relayed. At this time, since the port 10 through which the data is transmitted is equal to the learning valid port (step 1302), the VLAN-ID of the learning VLAN is registered as the transmission VLAN-ID 708 (step 1306).

Since the relay process operation is carried out within the VLAN-A (1810), a second layer address contained in an IP header of a multicast packet is registered as the transmission source second layer address 710. Also, the timer for the valid/invalid flag 706 is set (step 1009).

In the information relay apparatus 2, the data 1904 directed to the VLAN-N (1810), which is transmitted by the information relay apparatus 4, is received from the port 6. A new entry of the IP multicast learning table 70 is formed with respect to the destination IP multicast packet which is newly received from the VLAN-A (1810), and then the reception information is registered into this formed entry (step 1006). At this time, since the port 6 of the received VLAN-A (1810) is equal to the learning valid port (step 1302), the VLAN-ID of the learning VLAN is registered as the representative reception VLAN-ID 703 (step 1306).

Next, in accordance with a result of the retrieving operation (step 1001) of the IP multicast table 60, a relay process operation of the multicast data within the VLAN-A (1810) is carried out. With respect to the port 4 where the terminal A2 belonging to the VLAN-A (1810) is present, the transmission information of the IP multicast learning table 70 is registered from the information relay apparatus 2 (step 1008). The data 1905 is transmitted to the VLAN-A (1810). Since the port 4 is equal to the learning valid port (step 1302), the transmission VLAN-ID 708 is registered as the VLAN-ID of the VLAN-A (1810) (step 1303). Since the relay operation within the VLAN-A (1810) is carried out, the second layer address contained in the IP header of the multicast packet is registered as the transmission source second layer address 710.

Next, based upon a result of the retrieving operation (step 1001) of the IP multicast table 60, a 61 replay process operation of the multicast data from the VLAN-A (1810) to the VLAN-B (1811) is carried out. The transmission information of the IP multicast learning table 70 is registered with respect to the terminal 1803 belonging to the VLAN-B (1811) and the information relay apparatus 1801 (step 1008).

The data 1906 is transmitted from the port 5, and also the data 1907 is transmitted from the port 6 to the VLAN-B (1811). While the data are transmitted to the VLAN-B (1811), the TTL value is subtracted only by 1 to transmit the data. At this time, since the port 5 of the VLAN-B is not equal to the learning valid port (step 1302), the VLAN-ID of the VLAN-B (1811) is registered as the transmission VLAN-ID 708 of the IP multicast learning table 70 (step 1303). The second layer address contained in the IP header of the multicast packet corresponding to the VLAN-B (1811) in the information relay apparatus 2 is registered as the transmission source second layer address 710. Since the port 6 is equal to the representative reception port 704 of the IP multicast learning table 70 and furthermore as the representative reception VLAN-ID 703, the VLAN-ID of the learning VLAN is registered (1304), the transmission information with respect to the port 6 is not carried out. In other words, such a registering operation that the transmission VLAN-ID 708 is registered as the VLAN-ID of the VLAN-B (1812) is performed only for the port 5 in the information relay apparatus 2. Also, the timer for the valid/invalid flag 706 is set (step 1009).

In the information relay apparatus 4, the data 1907 directed to the VLAN-B (1811), which is transmitted by the information relay apparatus 2, is received. As a result of the retrieving operation of the IP multicast table 60, the relay process operation within the VLAN-B is carried out. The data 1907 is such a data identical to the data 1903 which has already been received by the information relay apparatus 4 from the VLAN-A (1810), and the reception information updating process operation (step 1014) of the IP multicast learning table 70 is performed. At this time, since the learning packet TTL value which has been registered into the IP multicast learning table 70 is larger than the TTL value of the received multicast packet, the updating operation of the reception information is not carried out. Since the relay process operation is carried out within the VLAN-B (1811), the transmission information is registered with respect to the port 11 where the information relay apparatus 3 belonging to the VLAN-B (1811) is present (step 1008). The data 1908 is transmitted from the port 11 to the VLAN-B (1811). Since the port 11 is equal to the learning valid port (step 1302), a VLAN-ID of a learning VLAN is registered as the transmission VLAN-ID 708 (step 1306).

Since the relay process operation within the VLAN-B (1811) is carried out, a second layer address contained in an IP header of a multicast packet is registered as the transmission source second layer address 710. Also, while the data 1903 is received, when the learning process operation is carried out, the timer for the valid/invalid flag 706 is again set (step 1009).

Subsequently, since both a learning process operation and a relay process operation are carried out in a similar manner, the information relay apparatus 3 receives from the port 8, the data 1908 directed to the VLAN-B (1811). While the learning process operation is carried out, the information relay apparatus 3 transmits the data 1909 directed to the VLAN-B (1811) from the port 7.

Subsequently, after the valid/invalid flag 706 of the IP multicast learning table 70 becomes valid (step 1011) in each of the information relay apparatuses 1801, the multicast server 1802 transmits the multicast data 1910 directed to the same destination. In this case, in accordance with the result of the retrieving-operation (step 1004) of the IP multicast learning table 70, the information relay apparatus 1 executes a relay process operation of a learned packet with respect to the registered port 2 and the registered port 3 (step 1016). At this time, the information relay apparatus 1 transmits data 1911 directed to the VLAN-A (1810) to the port 2, and also transmits data 1912 directed to the learning VLAN to the port 3.

In the information relay apparatus 4, the data 1912 directed to the learning VLAN, which is transmitted by the information relay apparatus 1, is received, and also such a table entry where the representative reception VLAN-ID 703 is equal to the VLAN-ID of the learning VLAN is hit in the IP multicast learning table 70 (steps 1004 and 1005). In accordance with the result of this retrieving operation, the relay process operation of the learned multicast is carried out with respect to the registered port 10 and the registered port 11 (step 1016). At this time, the information relay apparatus 4 transmits both data 1913 and data 1914, which are directed to the learning VLAN to the port 10 and the port 11, respectively.

In the information relay apparatus 2, the data 1914 directed to the learning VLAN, which is transmitted by the information relay apparatus 4, is received, and such a table entry that the representative reception VLAN-ID 703 is equal to the VLAN-ID of the learning VLAN is hit (steps 1004 and 1005) in the IP multicast learning table 70. As a result of this retrieving operation, a relay process operation of the learned multicast is carried out with respect to the registered port 4 and also the registered port 5 (step 1016). At this time, the information relay apparatus 2 transmits data 1915 directed to the VLAN-A (1810) to the port 4, and also transmits data 1916 directed to the VLAN-B (1811) to the port 5. However, the relay process operation of the multicast packet is not carried out in the port 6. This is because when a first packet is received with respect to the port 6, no registering operation to the IP multicast learning table 70 is carried out (step 1304). As a consequence, it is possible to avoid such a fact that either the same multicast packet or the duplicated multicast packet is returned from the information relay apparatus 2 to the information relay apparatus 4 so as to be relayed.

Operations executed in the information relay apparatus 3 are carried out in a similar manner. Since the relay process operation with respect to the data 1913 directed to the learning VLAN, which is received from the port 8, the data 1917 directed to the VLAN-B (1811) is transmitted to the port 7.

The above-described operations correspond to one example of the IP multicast communication executed in the information network of FIG. 18.

Figure 20:
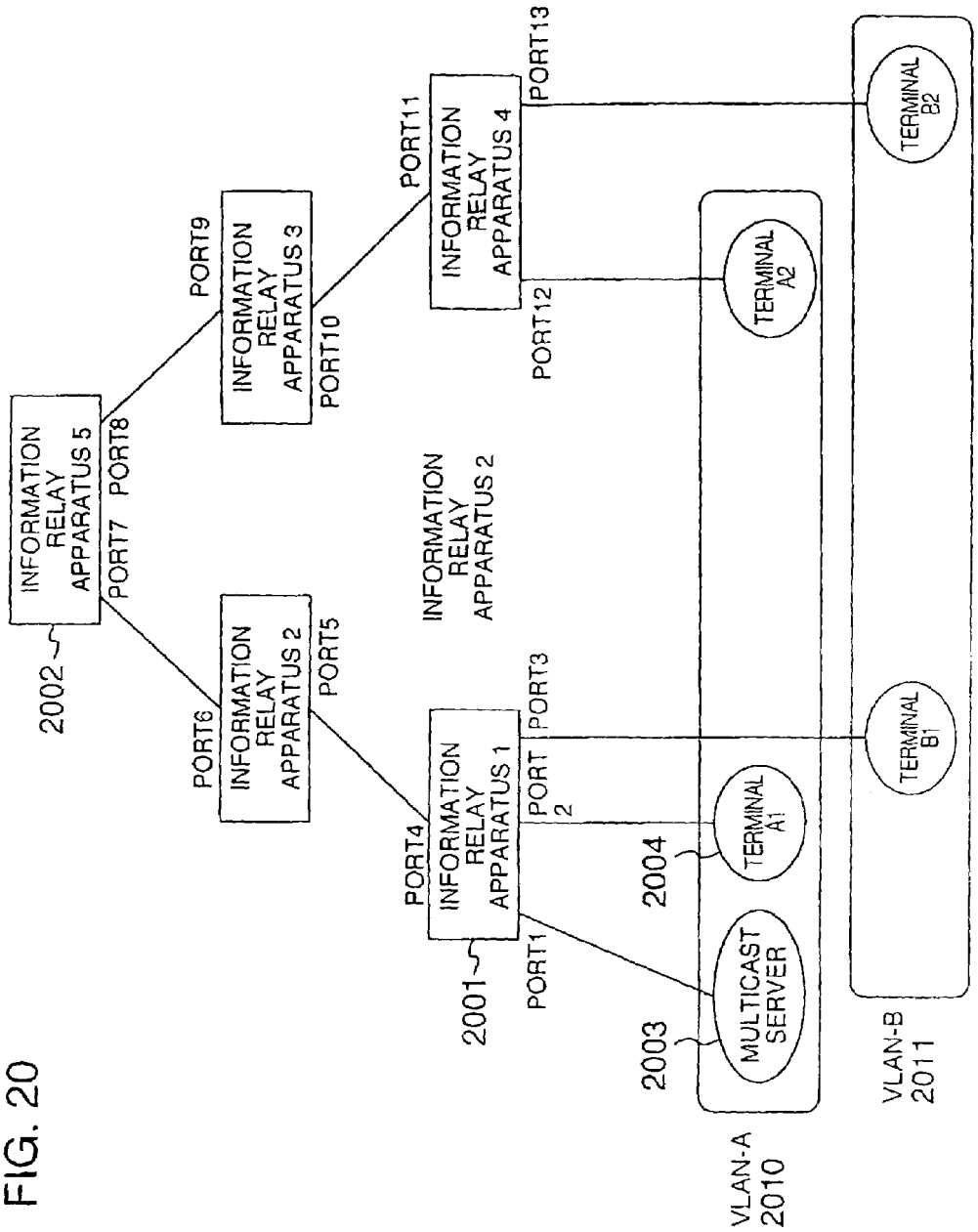
FIG. 20 is a conceptional structural diagram for indicating an information network containing another example of the information relay apparatus according to the present invention.

FIG. 20 schematically shows an example of another information network using information relay apparatuses according to the present invention.

The information network indicated in FIG. 20 is arranged by a plurality of information relay apparatuses 2001 (namely, information relay apparatus 1, information relay apparatus 2, information relay apparatus 3, and information relay apparatus 4) equipped with various functions, according to the present invention, and further, another information relay apparatus 2002 (namely, information relay apparatus 5) which is not provided with a learning function and the like, according to the present invention. The information relay apparatus 1 and the information relay apparatus 4 are connected to the information relay apparatus 2 and the information relay apparatus 3, respectively. Both the information relay apparatus 2 and the information relay apparatus 3 are connected via the information relay apparatus 5 to each other. Both a multicast sever 2003 and a terminal A1, which belong to a VLAN-A (2010), and further, another terminal B1 which belongs to a VLAN-B (2011) are connected to the information relay apparatus 1.

The terminal A1 corresponds to any one of plural multicast reception terminals 2004 (terminal A1, terminal A2, terminal B1, terminal B2). A terminal A2 belonging to the VLAN-A (2010) and a terminal B2 belonging to the VLAN-B (2011) are connected to the information relay apparatus 4.

It is now assumed that the terminal A1, the terminal A2, the terminal B1, and the terminal B2 are grouped in a group member of multicast data transmitted by the multicast server 2003. Also, ports (namely, port 4 to port 11) connected to the respective information relay apparatuses belong to both the VLAN-A (2010) and the VLAN-B (2011). It is also assumed that both the connection ports (namely, port 4 and port 5) connected between the information relay apparatus 1 and the information relay apparatus 2, and also the connection ports (namely, port 10 and port 11) connected between the information relay apparatus 3 and the information relay apparatus 4 are set as learning valid ports. This is because the information relay apparatus 2001 (namely, information relay apparatus 1, information relay apparatus 2, information relay apparatus 3, and information relay apparatus 4) are connected to each other, which are provided with the various functions, according to the present invention. The connection ports (namely, port 6 and port 9) among the information relay apparatus 2, the information relay apparatus 3, and the information relay apparatus 5 are not set as the learning valid ports, because the information relay apparatus 5 is not provided with the learning function, according to the present invention.

It is also assumed that such a multicast table 60 used to execute a relay operation from the VLAN-A (2010) to the VLAN-B (2011) among the multicast tables 60 provided in the respective information relay apparatuses is owned by the information relay apparatus 1.

Figure 21:
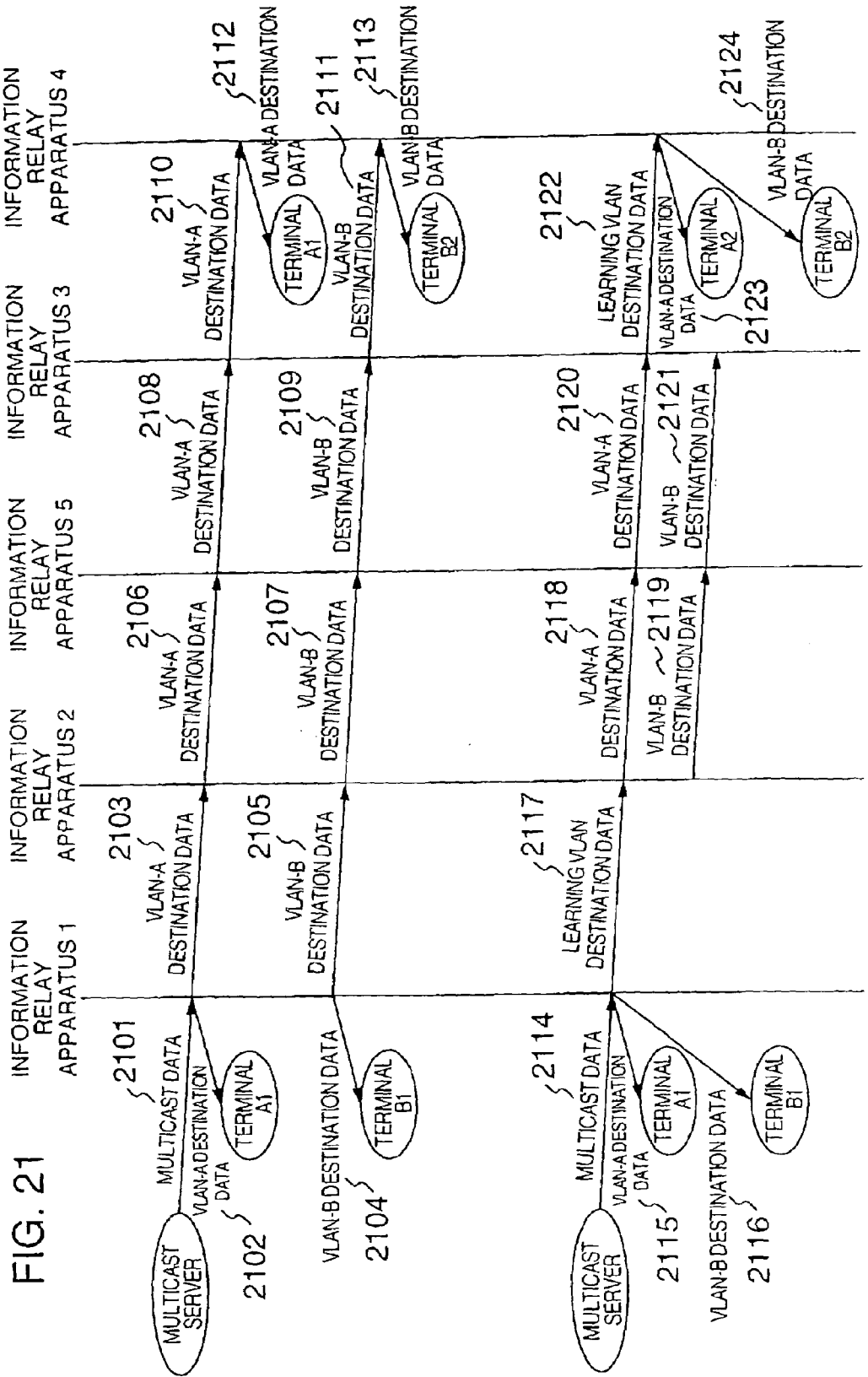
FIG. 21 is a conceptional diagram for indicating another example of a packet flow of an IP multicast communication executed in an information network containing the information relay apparatus according to the present invention.

Referring now to a packet flow shown in FIG. 21, an example of an IP multicast communication executed in the information network of FIG. 20 will be described.

First, the multicast server 2003 transmits multicast data 2101. The information relay apparatus 1 executes both a learning process operations and a relay process operation. The multicast server 2003 transmits data 2102 from the port 2 to the VLAN-A (2010), and also transmits data 2104 from the port 3 to the VLAN-B (2011). With respect to the data transmission to the port 4, after the learning process operations (steps 1006, 1007, 1008, 1009) directed to the learning VLAN are carried out, data 2103 is transmitted to the VLAN-A (2010) and also data 2105 is transmitted to the VLAN-B (2011) (step 1010).

In the information relay apparatus 2, the data 2103 directed to the VLAN-A (2010) and transmitted from the information relay apparatus 1 is received, and then the learning process operation (step 1006, 1007, 1008, 1009) are carried out. After the learning process operation is carried out, the information relay apparatus 2 performs the relay process operation (step 1010), and transmits data 2106 directed to the VLAN-A (2010) to the port 6. In this learning process operation (steps 1006, 1007, 1008, 1009), since the port 5 functioning as the reception port is equal to the learning valid port, the representative reception VLAN-ID 703 registered in the IP multicast learning table 70 becomes a VLAN of a learning VLAN (step 1006). Also, since the port 6 functioning as the transmission port is not equal to the learning valid port (step 1302), the transmission VLAN-ID 708 which is registered in the IP multicast learning table 70 becomes the VLAN-ID of the VLAN-A (2010) (step 1303).

Thereafter, the information relay apparatus 2 receives the data 2105 directed to the VLAN-B (2011). Such transmission information that the transmission VLAN-ID 708 is used as the VLAN-ID of the VLAN-B (2011) by executing the updating process operation of the IP multicast learning table 70 is additionally registered (step 1303), and data 2107 is transmitted to the VLAN-B (2011) by executing the relay process operation (step 1010).

Since the information relay apparatus 5 corresponds to such an information relay apparatus equipped with no such a learning function according to the present invention, a predetermined relay process operation is carried out, and this relay process operation is defined by the protocol, for instance, TCP/IP protocol. When the information relay apparatus receives the data 2106 directed to the VLAN-A (2010), this information relay apparatus 5 relays the data 2108 directed to the VLAN-A (2010) to the port 8. Similarly, when the information relay apparatus 5 receives the data 2107 directed to the VLAN-B (2011), this information relay apparatus 5 relays the data 2109 directed to the VLAN-B (2011) to the port 8.

In the information relay apparatus 3, when the data 2108 directed to the VLAN-A (2010) and transmitted from the information relay apparatus 5 is received, the learning process operation (steps 1006, 1007, 1008, 1009) are carried out. After the learning process operation (steps 1006 to 1009) is carried out, the relay process operation (step 1010) is performed, and data 2110 directed to the VLAN-A (2010) is transmitted to the port 10. In this learning process operation (steps 1006 to 1009), the representative reception VLAN-ID 703 corresponds to the VLAN-ID of the VLAN-A (2010). Also, since the port 10 is equal to the learning valid port, the VLAN-ID of the learning VLAN is registered into the transmission VLAN-ID 708 of the IP multicast learning table 70 (step 1306).

Thereafter, the information relay apparatus 3 receives the data 2109 directed to the VLAN-B (2011), and then executes the learning process operation (steps 1014, 1015, 1008, 1009). After the learning process operation is carried out, the information relay apparatus 3 performs the relay process operation (step 1010), and also transmits data 2111 directed to the VLAN-B (2011) to the port 10. In this learning process operation (steps 1006, 1007, 1008, 1009) executed when the data 2108 directed to the VLAN-A (2010) is received, there is such a registering operation that the transmission VLAN-ID 708 has been registered as the VLAN-ID of the learning VLAN with respect to the port 10 (step 1305). As a consequence, the transmission information of the IP multicast learning table 70 is not updated in the learning process operation (steps 1014, 1015, 1008, 1009). As to the transmission information with respect to the port 10, only the VLAN-ID of the learning VLAN is registered as the transmission VLAN-ID 708. It should also be noted that the representative reception VLAN-ID 703 is not updated, but remains as the VLAN-ID of the VLAN-A (2010), as a result of the comparison (step 1101) between the TTL values of the multicast packets.

When the information relay apparatus 4 receives the data 2110 directed to the VLAN-A (2010), this information relay apparatus 4 executes both the learning process operation (steps 1006, 1007, 1008, 1009) and the relay process operation (step 1010). Since this relay process operation (step 1010) is carried out, the information relay apparatus 4 transmits data 2112 directed to the VLAN-A (2010) to the port 12.

Also, when the information relay apparatus 4 receives the data 2111 directed to the VLAN-B (2011), this information relay apparatus 4 executes both the learning process operation (steps 1014, 1015, 1008, 1009) and the relay process operation (step 1010). Since this relay process operation (step 1010) is carried out, the information relay apparatus 4 transmits data 2113 directed to the VLAN-B (2011). In this learning process operation (steps 1014, 1015, 1008, 1009), the representative reception VLAN-ID 703 becomes the VLAN-ID of the learning VLAN (step 1306).

In each of the information relay apparatuses 2001 equipped with the learning functions according to the present invention, after the valid/invalid flag 706 of the IP multicast learning table 70 has become valid, the multicast server 2003 transmits multicast data 2114 directed to the same destination. In accordance with the result of the retrieving operation (step 1004) as to the IP multicast learning table 70, the information relay apparatus 1 performs the relay process operation (step 1016) of the learned multicast with respect to the port 2, the port 3, and the port 4, which are registered into the transmission information. In this case, the information relay apparatus 1 transmits data 2115 directed to the VLAN-A (2010) to the port 2. Also, the information relay apparatus 1 transmits data 2116 directed to the VLAN-B (2011) to the port 3. Further, the information relay apparatus 1 transmits data 2117 directed to the learning VLAN to the port 4.

The information relay apparatus 2 receives the data 2117 directed to the learning LAN and transmitted by the information relay apparatus 1. In the retrieving operation of the IP multicast learning table 70 (step 1004), such a table entry that the representative reception VLAN-ID 703 corresponding to the data 2117 directed to the learning VLAN is equal to the VLAN-ID of the learning VLAN is hit. In the hit IP multicast learning table 70, two sets of the transmission VLAN-ID 708 are registered, namely the VLAN-ID of the VLAN-A (2010) and the VLAN-ID of the VLAN-B (2011) are registered in correspondence with the port 6 registered in the transmission port 707. While the relay process operation (step 1016) of the learned multicast is carried out, the information relay apparatus 2 transmits data 2118 directed to the VLAN-A (2010) and data 2119 directed to the VLAN-B (2011) to such a port 6 which is not equal to the learning valid port.

The information relay apparatus 5 executes a process operation similar to the process operation performed in the case that both the data 2106 directed to the VLAN-A (2010) and the data 2107 directed to the VLAN-B (2011) are received. To the port 8, the information relay apparatus 5 transmits data 2120 directed to the VLAN-A (2010) and data 2121 directed to the VLAN-B (2011).

The information relay apparatus 3 receives the data 2120 directed to the VLAN-A (2010) and transmitted by the information relay apparatus 5. In the retrieving operation of the IP multicast learning table 70 (step 1004), such a table entry that the representative reception VLAN-ID 703 corresponding to the data 2120 directed to the VLAN-A (2010) is equal to the VLAN-A (2010) is hit (step 1005). In the hit IP multicast learning table 70, the VLAN-ID of the learning VLAN registered is registered as the transmission VLAN-ID 708 in correspondence with the port 11 registered in the transmission port 707. In accordance with this registering operation, the information relay apparatus 3 transmits data 2122 directed to the learning VLAN to the port 11.

The information relay apparatus 3 receives the data 2122 directed to the VLAN-B (2011), which is transmitted by the information relaying apparatus 5. As a result of the retrieving operation (step 1004) of the IP multicast learning table 70, the representative reception VLAN-ID 703 corresponding to the data 2121 directed to the VLAN-B (2011) is equal to the VLAN-ID of the VLAN-A (2010), and there is no registering operation as to the VLAN-ID of the VLAN-B (2011). As a consequence, the information relay apparatus 3 discards the packet without executing the relay process operation.

The information relay apparatus 4 receives the data 2122 directed to the learning VLAN, which is transmitted by the information relay apparatus 4. In accordance with the relay process operation (step 1016) of the learned multicast, the information relay apparatus 4 transmits the data 2123 directed to the VLAN-A (2010) to the port 12, and also transmits the data 2124 directed to the VLAN-B (2011) to the port 13.

The above-explained operations correspond to one example of the IP multicast communication executed in the information network shown in FIG. 20.

As previously described, since the information relay apparatus equipped with the learning function, according to the present invention, is employed, the data transmission to such a network which is the physically same relay apparatus, but the logically different network can be suppressed only one time among the networks which are logically constituted irrespective to the physical structures thereof, for instance, in the multicast communication in the VLANS which are widely popularized in the LAN switch apparatus.

Also, the multicast packet containing the data having the same contents is merely received only one time, and this multicast packet is related to all of preselected relay destinations. As a result, the multicast packet can be distributed by using a smaller number of traffics even in a physically complicated network. It should be understood that the same content implies contents of transmission data of multicast packets.

As a consequence, it is possible to realize the multicast service which can be applied to the physical network structures without increasing the traffic on the network, higher than the necessary amount of the traffic.

Also, since the process amount of the multicast relay process operation in the information relay apparatus is reduced, the work load given to the information relay apparatus can be decreased, so that the multicast relay process operation can be carried out in higher speeds.

As a consequence, the multicast service with the high quality can be realized and utilized.

It should also be noted that the present invention is not limited to the above-explained embodiments. For example, as to the protocol used to provide the multicast service directed to the learning process operation, according to the present invention, the present invention is not limited to the IPv4 multicast protocol but also the IPv6 multicast protocol as exemplified in the above-explained embodiments. Alternatively, since a multicast learning table similar to the above-explained multicast learning table of the present invention is employed, the information relay apparatus of the present invention may be applied to other protocols.

What is claimed is:

1. A network relay apparatus for connecting networks to each other, which are logically constructed, comprising:
    a reception port;
    a transmission port; and
    relay means for relaying a multicast packet between logically constructed networks based upon reception information containing reception port information related to a reception port which receives the multicast packet, and reception source network information related to a first network functioning as a reception source of said multicast packet; and also transmission information provided in correspondence with said reception information and containing transmission port information related to a port through which said multicast packet is transmitted, and transmission source network information related to a second network functioning as a transmission destination of said multicast packet,
    wherein said reception information contains life information of a received multicast packet; and one of first life information and second information is registered into said life information, as a result of a comparison made between said first life information which has already been registered in said life information and said second life information owned by a newly received multicast packet.

2. A network relay apparatus as claimed in claim 1 wherein:
    in a case that said life information is said second life information, said reception port information and said reception source network information are updated/registered into reception port information and reception source network information of a multicast packet containing said second life information, respectively.

3. A network apparatus as claimed in claim 2 wherein:
    said reception information includes:
    valid/invalid registering information which is registered as valid information after said updating/registering operation has been carried out and thereafter a predetermined time duration has passed.

4. A network relay apparatus as claimed in claim 2 wherein:
    said reception information includes:
    valid/invalid registering information which becomes valid after a predetermined time duration has passed since a multicast packet has been first received.

5. A network relay apparatus as claimed in claim 1 further comprising a registering means that additionally registers information related to a multicast packet into said transmission information when the multicast packet is received.

6. A network relay apparatus as claimed in claim 1 wherein:
    said network relay apparatus is further comprised of:
    a learning process unit for forming both said reception information and said transmission information while the multicast packet is relayed.

7. A network relay apparatus as claimed in claim 1 wherein:
    said reception information includes:
    a destination address and a transmission source address, which are related to such a multicast packet which has been registered as said reception information; and
    packet discrimination information capable of discriminating as to whether or not said multicast packet registered as said reception information has already been registered into said reception information.

8. A network relay apparatus as claimed in claim 7 wherein:
    said packet discrimination information includes:
    reception source network information related to a network of a reception source concerning the multicast packet which is registered into said reception information; and
    reception port information related to a multicast packet received port.

9. A network relay apparatus as claimed in claim 1, wherein said relay means comprises:
    a reception processing unit for performing a multicast packet allocating operation in response to a sort of a multicast packet;
    a relay processing unit for performing a relay processing operation capable of transmitting the multicast packet allocated by said reception processing unit to transmission destinations including logically different networks of information; and
    a learning process unit for registering, into a predetermined table, said reception information and said transmission information related to said multicast packet to be transmitted, when said relay processing unit carries out said relay processing operation.

10. A network relay apparatus as claimed in claim 1, said relay apparatus constituting VLAN (Virtual Area Local Network)
wherein said relay means includes a VLAN table including:
a discrimination number for a VLAN to which another relay apparatus connected to said relay apparatus belongs;
port information related to a port connected to said another relay apparatus, which is provided in correspondence with said discrimination number; and
valid port information provided in correspondence with said port information, capable of discriminating as to whether or not said another relay apparatus owns a learning function by which information related to a multicast packet is registered into a predetermined table similar to said relay apparatus; and in which when said another relay apparatus owns said learning function, said port is regarded as a valid port and is registered.

11. A relay apparatus as claimed in claim 10 wherein:
said valid port information is registered as a valid port, since the own relay apparatus transmits/receives a signal to/from said another relay apparatus.

12. A relay apparatus as claimed in claim 11 wherein:
said signal corresponds to such a packet exclusively used in said relay apparatus.

13. A relay apparatus as claimed in claim 12 wherein:
said signal corresponds to such a signal produced by adding specific information to a header of a packet.

14. A network relay apparatus as claimed in claim 1, wherein said relay means includes a multicast relay destination registering table into which when a multicast packet is received from more than one network which are physically identical to each other, but are logically different from each other, one network among said networks physically identical to each other, but logically different from each other is registered as a representative network.

15. A network relay apparatus as claimed in claim 1, wherein said relay apparatus relays a multicast packet received from a first logical network to a second logical network,
said relay means receives said multicast packet transmitted from said first logical network via one port from another information relay apparatus which similarly constitutes logical networks, and transmits said multicast packet via the other port to another logical network containing either said first logical network or said second logical network.

16. A network relay apparatus as claimed in claim 1, wherein:
in such a case that similar to the information relay apparatus, another information relay apparatus connected to the information relay apparatus owns a learning function related to a relay process operation of a multicast packet,
both said information relay apparatus and said another information relay apparatus constitute a logical network which is exclusively employed so as to perform the multicast relay process operation.

17. A network relay apparatus as claimed in claim 1, wherein said relay means includes:
a learning table into which transmission destination information of transmission destinations are registered, while a multicast packet is relayed, the relay apparatus being required to transmit the multicast packet to said transmission destinations; and
a learning process unit for relaying said multicast packet to the transmission destinations registered in said learning table by comparing both a destination address and a transmission source address of a multicast packet received from one network among said networks with said learned transmission destination information which is registered in said learning table.

18. A network relay apparatus as claimed in claim 1, wherein said relay means includes:
a learning table into which information used to relay a multicast packet is registered; and
a learning process unit for relaying said multicast packet to ports contained in the learned information registered in said learning table by comparing both a destination address and a transmission source address of a multicast packet received from one network among said networks with said learned information which is registered in said learning table.

19. A network relay apparatus as claimed in claim 1, wherein said relay means includes a multicast information table including:
a reception information area into which both destination information and transmission source information contained in a multicast packet received from a first logically-constituted network are registered in correspondence with network information related to said first network; and
a transmission information area into which a logically-constituted network is registered in correspondence with a port connected to said second network, a multicast packet being transmitted to said logically-constituted second network.

20. A network relay apparatus for connecting networks to each other, which are logically constructed, comprising:
a reception port;
a transmission port; and
relay means for relaying a multicast packet between logically constructed networks based upon reception information containing reception port information related to a reception port which receives the multicast packet, and reception source network information related to a first network functioning as a reception source of said multicast packet; and also transmission information provided in correspondence with said reception information and containing transmission port information related to a port through which said multicast packet is transmitted, and transmission source network information related to a second network functioning as a transmission destination of said multicast packet, said transmission information including rewrite information which is provided with a multicast packet and is rewritten when the multicast packet is relayed, and
said rewrite information including comparison information acquired by comparing life information obtained after rewriting operation with life information obtained before rewriting operation while said multicast packet is relayed and a second layer address which is applied to a second layer of an OSI (Open systems Interconnection) reference model obtained after rewriting operation while said multicast packet is relayed.

21. An information relay apparatus for relaying information in a plurality of logical information networks, comprising:
a multicast relay destination registering table into which a relay destination in a predetermined multicast relay process operation is registered; and multicast relay means operated in such a manner that when data is relayed from networks which are physically identical to each other, but are logically different from each other to a same destination with reference to said multicast relay destination registering table, such data having a same content are relayed only one time to said same destination with respect to a relay destination, wherein:

said relay means includes a multicast learning table as said multicast relay destination registering table, during a learning period for a predetermined time after receiving a first multicast packet from said information network, said relay means registers, if not registered, reception information and transmission information related to said multicast packet received into said learning table and executes relay processing, but if said reception information and said transmission information have already been registered, said relay means does not execute relay processing, and after said learning period, said relay means executes relay processing of said received multicast packet according to said learning table.

22. An information relay apparatus as claimed in claim 21, wherein said relay means receives only one time, one of multicast packets having a same content and directed to a same destination from information networks which are physically identical to each other, but are logically different from each other after a first multicast packet has been received from said information networks, and thereafter, a preselected time duration has passed.

23. An information relay apparatus as claimed in claim 21, said relay means transmits one time, one of multicast packets having a same content to relay a destination which constitutes such networks physically identical to each other, but logically different from each other in a case that multicast packets having the same content and directed to the same destination are transmitted after a first multicast packet has been received from said information networks, and thereafter, a preselected time duration has passed.

24. An information relay apparatus as claimed in claim 21, wherein said relay apparatus relays a multicast packet received from a first logical network to a second logical network, and said relay means relays said multicast packet received from said first logical network only one time after a first multicast packet has been received from said second logical network, and thereafter, a predetermined time duration has passed, whereby said multicast packet is relayed to information relay apparatuses which constitute said second logical network.

25. An information relay apparatus as claimed in claim 21, wherein said relay means includes transmission means that transmits, after a multicast packet has been received from a network which is connected to an own information relay apparatus and is logically constituted, and thereafter, a predetermined time duration has passed, a multicast packet received from said network only one time to another network which is logically constituted.

26. An information relay apparatus as claimed in claim 25 wherein:

said multicast packet which is transmitted by said transmission means only one time owns a same destination as that of a multicast packet which is received from said network within said predetermined time duration, and owns a same transmission source so that of said second-mentioned multicast packet, and further, is received from a same port for said second-mentioned multicast packet.

27. An information relay apparatus for relaying information in a plurality of logical information networks, comprising:

a multicast relay destination registering table into which a relay destination in a predetermined multicast relay process operation is registered; and multicast relay means operated in such a manner that when data is relayed from networks which are physically identical to each other, but are logically different from each other to a same destination with reference to said multicast relay destination registering table, such data having a same content are relayed only one time to said same destination with respect to a relay destination, wherein in such a case that a multicast packet is received from more than one network which are physically identical to each other, but are logically different from each other, one network selected from more than one network which are physically identical to each other, but are logically different from each other is registered as a representative network in said multicast relay destination registering table, and wherein a difference between life information about a multicast packet when being received from said network registered as representative network, and life information about said multicast packet when the multicast packet received by the multicast relay process operation is transmitted is registered as rewrite information in said multicast relay destination registering table.

28. An information relay apparatus as claimed in claim 27 wherein:

said networks which are physically identical to each other, but are logically different from each other include:

a logical network which is exclusively provided in order to execute a multicast relay process operation.

29. An information relay apparatus as claimed in claim 27 wherein:

in such a case that a multicast packet is received from more than one network which are physically identical to each other, but are logically different from each other, one network selected from more than one network which are physically identical to each other, but are logically different from each other is registered as a representative network in said multicast relay destination registering table.

30. An information relay apparatus as claimed in claim 27 wherein:

among said more than one network which are physically identical to each other, but are logically different from each other, and also which receive the same, or duplicated multicast packets, such a reception network which has received the multicast packet whose life information value is large is registered as a representative network in said multicast relay destination registering table.

31. An information relay apparatus as claimed in claim 27 wherein:

said multicast relay means rewrites a multicast packet received from said network registered as the represen tative network based upon said rewrite information, and thereafter relays the rewritten multicast packet.

32. An information relay apparatus as claimed in claim 31 wherein:

with respect to the relay process operation of an IPv4 (Internet Protocol version 4) multicast, said life information corresponds to a TTL value of an IPv4 header of a multicast packet.

33. An information relay apparatus as claimed in claim 31 wherein:

with respect to the relay process operation of an IPv6 (Internet Protocol version 6) multicast, said life information corresponds to a Hop Limit value of an IPv6 header of a multicast packet.

* * * * *